US008571314B2

(12) United States Patent
Tao et al.

(10) Patent No.: US 8,571,314 B2
(45) Date of Patent: Oct. 29, 2013

(54) THREE-DIMENSIONAL DISPLAY SYSTEM WITH DEPTH MAP MECHANISM AND METHOD OF OPERATION THEREOF

(75) Inventors: Li Tao, Irvine, CA (US); Yeong-Taeg Kim, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 0 days.

(21) Appl. No.: 13/218,444

(22) Filed: Aug. 25, 2011

(65) Prior Publication Data
US 2012/0057776 A1    Mar. 8, 2012

Related U.S. Application Data

(60) Provisional application No. 61/379,680, filed on Sep. 2, 2010.

(51) Int. Cl.
G06K 9/00    (2006.01)
G06K 9/34    (2006.01)

(52) U.S. Cl.
USPC .......................................... 382/168; 382/154

(58) Field of Classification Search
USPC ......... 382/168–172, 154, 199, 260, 276, 285, 382/293; 348/135, E7.085
See application file for complete search history.

(56) References Cited

U.S. PATENT DOCUMENTS

| 3,069,654 | A | | 12/1962 | Hough |
| 4,947,347 | A | | 8/1990 | Sato |
| 5,889,884 | A | * | 3/1999 | Hashimoto et al. ........... 382/168 |
| 6,263,089 | B1 | * | 7/2001 | Otsuka et al. ................. 382/107 |
| 6,477,267 | B1 | | 11/2002 | Richards |
| 6,961,458 | B2 | | 11/2005 | Dutta et al. |
| 7,463,770 | B2 | * | 12/2008 | Paquette et al. ............... 382/170 |
| 7,573,475 | B2 | | 8/2009 | Sullivan et al. |
| 7,573,489 | B2 | | 8/2009 | Davidson et al. |
| 7,668,377 | B2 | | 2/2010 | Curti et al. |
| 7,680,339 | B2 | * | 3/2010 | Tojo .............................. 382/199 |
| 2008/0192067 | A1 | | 8/2008 | Barenbrug et al. |
| 2008/0225045 | A1 | | 9/2008 | Birtwistle et al. |
| 2010/0079453 | A1 | | 4/2010 | Chen et al. |
| 2010/0141757 | A1 | * | 6/2010 | Baik et al. .................... 348/135 |
| 2010/0142924 | A1 | | 6/2010 | Yamashita et al. |

(Continued)

FOREIGN PATENT DOCUMENTS

EP    2562717    2/2013

OTHER PUBLICATIONS

Duda et al., "Use of the Hough Transformation to Detect Lines and Curves in Pictures", "Graphics and Image Processing", Jan. 1972, pp. 11-15, vol. 15, No. 1, Publisher: Communications of the ACM, Published in: Menlo Park, CA, US.

(Continued)

Primary Examiner — Amir Alavi
(74) Attorney, Agent, or Firm — IP Investment Law Group

(57) ABSTRACT

A method of operation of a three-dimensional display system includes: calculating an edge pixel image from a source image; generating a line histogram from the edge pixel image by applying a transform; calculating a candidate line from the line histogram meeting or exceeding a line category threshold for a horizontal line category, a vertical line category, a diagonal line category, or a combination thereof; calculating a vanishing point on the candidate line; and generating a depth map for the vanishing point for displaying the source image on a first device.

20 Claims, 14 Drawing Sheets

(56) References Cited

U.S. PATENT DOCUMENTS

2011/0188773 A1* 8/2011 Wei et al. .................. 382/260
2011/0188780 A1* 8/2011 Wang et al. ................ 382/293
2012/0051638 A1* 3/2012 Kawai et al. ............... 382/170

OTHER PUBLICATIONS

Satzoda et al., "Gradient Angle Histograms for Efficient Linear Hough Transform", Nov. 2009, pp. 3273-3276, Publisher: Proceedings fo rthe 16th IEEE International Conference on Image Porcessing, Published in: Singapore.
Tsai et al., "Block-based Vanishing Line and Vanishing Point Detection for 3D Scene Reconstruction", "ISPACS 2006", 2006, pp. 586-589, Publisher: IEEE, Published in: Tottori, JP.
Battiato S et al: "3D stereoscopic image pairs by depth-map generation", 3D Data Processing, Visualization and Transmission, 2004. 3DPVT 2004. Proceedings. 2nd International Symposium on Thessaloniki, Greece Sep. 6-9, 2004, Piscataway, NJ, USA, IEEE, Sep. 6, 2004, pp. 124-131.
Horst Wildenauer et al: "Vanishing Point Detection in Complex Man-made Worlds", 14th International Conference on Image Analysis and Processing, 2007. ICIAP 2007, Sep. 10-13, 2007—Modena, Italy, IEEE, Piscataway, NJ, USA, Sep. 1, 2007, pp. 615-622.
Kang H W et al: "Tour Into the Picture using a Vanishing Line and its Extension to Panoramic Images", Eurographics, Cambridge, GB, vol. 20, No. 3, Jan. 1, 2001, pp. 1-11.
Burazerovic, D. et al: "Automatic depth profiling of 2D cinema and photographic images", Image Processing (ICIP), 2009 16th IEEE International Conference on, IEEE, Piscataway, NJ, USA, Nov. 7, 2009, pp. 2365-2368.
Wa James Tam et al: "3D-TV Content Generation: 2D-to-3D Conversion", 2006 IEEE International Conference on Multimedia and Expo (ICME 2006), Toronto, Ont., Canada, IEEE, Piscataway, NJ, USA, Jul. 1, 2006, pp. 1869-1872.

* cited by examiner

THREE-DIMENSIONAL DISPLAY SYSTEM WITH DEPTH MAP MECHANISM AND METHOD OF OPERATION THEREOF

CROSS-REFERENCE TO RELATED APPLICATION(S)

This application claims the benefit of U.S. Provisional Patent Application Ser. No. 61/379,680 filed Sep. 2, 2010, and the subject matter thereof is incorporated herein by reference thereto.

TECHNICAL FIELD

The present invention relates generally to a graphical display system, and more particularly to a system for displaying a three-dimensional image.

BACKGROUND ART

Modern consumer and industrial electronics, especially devices with a graphical display capability, such as graphical display systems, televisions, projectors, cellular phones, portable digital assistants, and combination devices, are providing increasing levels of functionality to support modern life including three-dimensional display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to display three-dimensional images on consumer, industrial, and mobile electronics such as video projectors, televisions, monitors, gaming systems, or a personal digital assistant (PDA).

Three-dimensional display based services allow users to create, transfer, store, and/or consume information in order for users to create, transfer, store, and consume in the "real world". One such use of three-dimensional display based services is to efficiently present three-dimensional images on a display.

Three-dimensional display systems have been incorporated in projectors, televisions, notebooks, handheld devices, and other portable products. Today, these systems aid users by displaying available relevant information, such as diagrams, maps, or videos. The display of three-dimensional images provides invaluable relevant information.

However, displaying information in three-dimensional form has become a paramount concern for the consumer. Displaying a three-dimensional image that does not correlates with the real world decreases the benefit of using the tool.

Thus, a need still remains for a three-dimensional display system with depth map mechanism to display three-dimensional images best suited for the circumstance. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

The present invention provides a method of operation of a three-dimensional display system including: calculating an edge pixel image from a source image; generating a line histogram from the edge pixel image by applying a transform; calculating a candidate line from the line histogram meeting or exceeding a line category threshold for a horizontal line category, a vertical line category, a diagonal line category, or a combination thereof; calculating a vanishing point on the candidate line; and generating a depth map for the vanishing point for displaying the source image on a first device.

The present invention provides a three-dimensional display system, including: a first storage unit for storing a source image; an edge detection module, coupled to the first storage unit, for calculating an edge pixel image from the source image; a straight line search module, coupled to the edge detection module, for generating a line histogram from the edge pixel image using a transform; a line detection module, coupled to the straight line search module, for calculating a candidate line from the line histogram; a vanishing point calculation module, coupled to the line detection module, for calculating a vanishing point on the candidate line; and a depth generation module, coupled to the vanishing point calculation module, for generating a depth map from the vanishing point for displaying the source image on a first device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
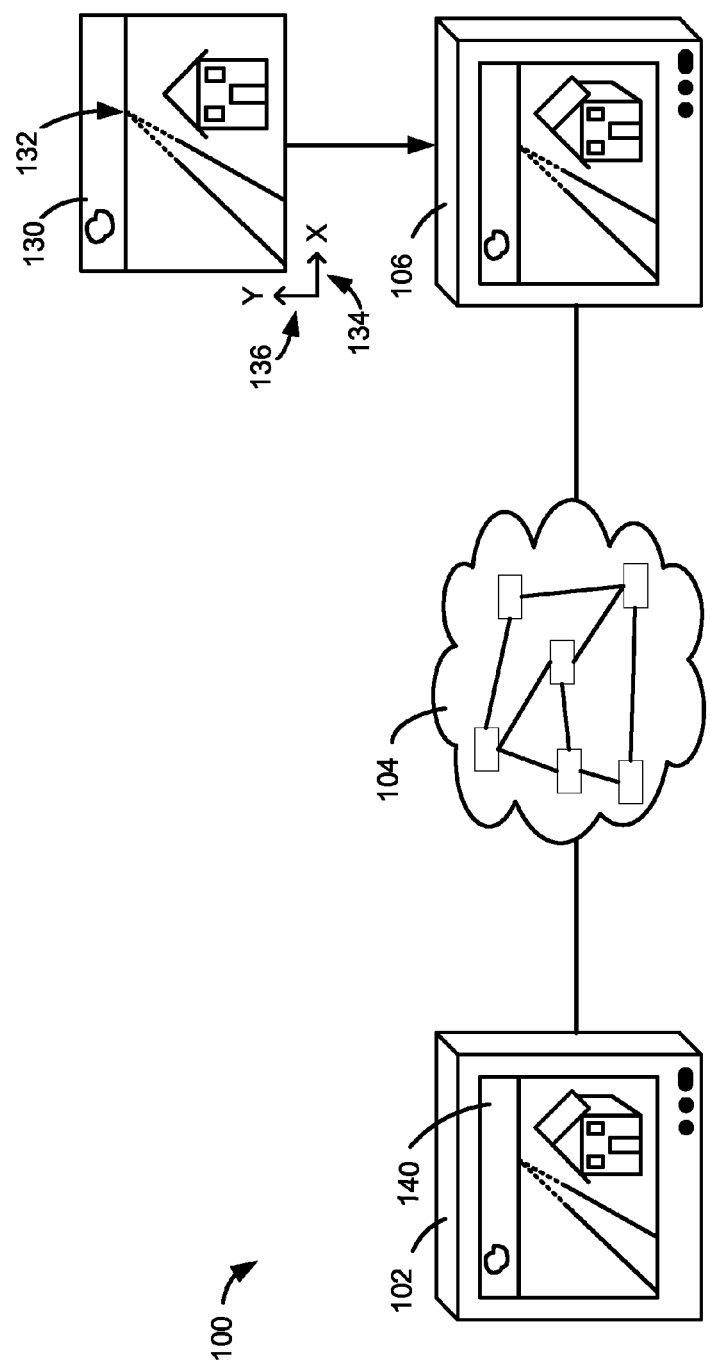
FIG. 1 is a three-dimensional display system with depth map mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which image information is expressed is not critical to some embodiments of the invention. For example, in some embodiments, image information is presented in the format of (X, Y), where X and Y are two ordinates that define the location of a pixel in an image.

As a further example, three-dimensional image information is presented by a format of (X, Y, Z) with related information for color of the pixel. In a further embodiment of the present invention, the three-dimensional image information also includes an intensity or brightness element.

For expository purposes, the term "horizontal" as used herein refers to the horizontal direction seen when viewing the drawing as indicated by the figure designation of "FIG.". The term "vertical" refers to a direction perpendicular to the horizontal as just defined. Terms, such as "above", "below", "bottom", "top", "side", "higher", "lower", "upper", "over", and "under", are defined with respect to the horizontal, as shown in the figures.

The term "diagonal" as used herein refers to a direction having an angle from the horizontal that is not zero degrees or ninety degrees. The term diagonal can also refer to an oblique direction having a positive or negative slope.

The term "image" is defined as a pictorial representation of an object. An image can include a two-dimensional image, three-dimensional image, video frame, a computer file representation, an image from a camera, a video frame, or a combination thereof. For example, the image can be can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a three-dimensional display system 100 with depth map mechanism in an embodiment of the present invention. The three-dimensional display system 100 can include a first device 102, such as a client or a server, connected to a second device 106, such as a client or server, with a communication path 104, such as a wireless or wired network.

The first device 102 is defined as a hardware unit for displaying graphical images. For example, the first device 102 can be of any of a variety of display devices, such as a television, projector system, cellular phone, personal digital assistant, a notebook computer, commercial display system, or other multi-functional mobile communication or entertainment device. The first device 102 can be a standalone device, or can be incorporated with a further entertainment or display system. The first device 102 can couple to the communication path 104 to communicate with the second device 106.

For illustrative purposes, the three-dimensional display system 100 is described with the first device 102 as a television display device, although it is understood that the first device 102 can be different types of display devices. For example, the first device 102 can also be a display system such as a projector, tablet computer, gaming system, cellular phone, desktop computer, or a server. The first device 102 can include a computing unit such as a server, cloud computer resource, or a desktop computer.

The first device 102 is defined as a hardware unit for displaying graphical images. The second device 106 can be any of a variety of display devices. For example, the second device 106 can be a television, a projector, tablet computer, cellular phone, desktop computer, or a server. The second device 106 can also include a computing unit such as a computer, grid computing resources, a virtualized computer resource, cloud computing resource, routers, switches, peer-to-peer distributed computing devices, or a combination thereof.

The second device 106 can be centralized in a single device, distributed across different devices, distributed across different geographical locations, or embedded within a telecommunications network. The second device 106 can have a means for coupling with the communication path 104 to communicate with the first device 102. The second device 106 can also be a device as described for the first device 102.

In another example, the first device 102 can be a particularized machine, such as a television, projector, mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a television, projector, portable computing device, a thin client, a notebook, a netbook, a smartphone, personal digital assistant, or a cellular phone, and as specific examples, an Apple iPhone™, Palm Centro™, or Moto Q Global™.

For illustrative purposes, the three-dimensional display system 100 is described with the second device 106 as a non-mobile display device, although it is understood that the second device 106 can be different types of display devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the three-dimensional display system 100 is shown with the second device 106 and the first device 102 as end points of the communication path 104, although it is understood that the three-dimensional display system 100 can have a different partition between the first device 102, the second device 106, and the communication path 104. For example, the first device 102, the second device 106, or a combination thereof can also function as part of the communication path 104.

The communication path 104 is defined as a communication system used to pass information between the first device 102 and the second device 106. The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (Wi-Fi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

The three-dimensional display system 100 can display a three-dimensional representation of a source image 130. The source image 130 is defined as a two-dimensional static picture of a three-dimensional scene. For example, the source image 130 can represent a variety of images including a video frame, a motion picture frame, a photograph, an x-ray image, a digital image, a scanned image, or a combination thereof.

The source image 130 can include rows and columns of pixels arranged in a rectangular array. The source image 130 can include an x-axis 134 and a y-axis 136. Rows of pixels can run along the x-axis 134. Columns of pixels can run along the y-axis 136.

The source image 130 can include a vanishing point 132. The vanishing point 132 is defined as a location representing a maximum depth of the source image 130. The vanishing point 132 can represent the location where the perspective of the source image 130 converges to a point. The three-dimensional display system 100 can display a three-dimensional image 140 as a three-dimensional representation of the source image 130

Figure 2:
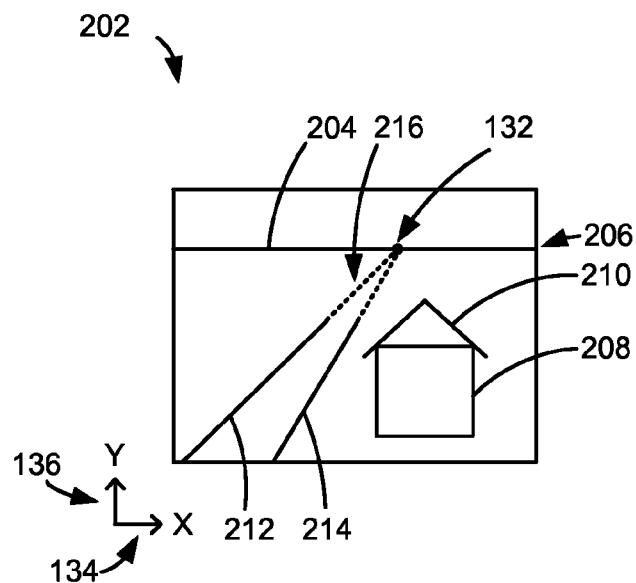
FIG. 2 is an example of an edge pixel image.

Referring now to FIG. 2, therein is shown an example of an edge pixel image 202. The edge pixel image 202 is generated from the source image 130 of FIG. 1 and represents the edges of objects in the source image 130.

The edge pixel image 202 is defined as a graphical representation of the edges of objects in the source image 130. An edge is defined as variations in brightness or color between adjacent areas in the source image 130 indicating the boundary between objects. Edges in the edge pixel image 202 are represented by a line segment 216.

The line segment 216 is defined as an element in the edge pixel image 202 that describes a portion of the line representing an edge. A line representing an edge of an object includes multiple instances of the line segment 216.

The edge pixel image 202 is defined as a digital image formed by a rectangular array of pixels arranged in rows and columns with the same dimensions as the source image 130. The edge pixel image 202 has the same orientation as the source image 130 including the orientation of the x-axis 134 and the y-axis 136.

Each pixel in the edge pixel image 202 can represent either a portion of a line or the lack of a portion of a line. Each pixel representing a portion of a line is represented by the line segment 216. The edge pixel image 202 can be generated by detecting the edges in the source image 130 and creating a graphical representation of the detectable edges of objects in the source image 130.

The edges of objects in the source image 130 are represented by lines in the edge pixel image 202. For example, the edge pixel image 202 can include representations of a horizontal line 204, a horizon 206, a vertical line 208, a first diagonal line 210, a second diagonal line 212, and a third diagonal line 214. The edge pixel image 202 can include the vanishing point 132.

The horizontal line 204 is defined as a line with a horizontal orientation. The horizontal line 204 is parallel to the x-axis 134 of FIG. 1 of the source image 130. The vertical line 208 is defined as a line with a vertical orientation. The vertical line 208 is parallel to the y-axis 136 of FIG. 1 of the source image 130.

The first diagonal line 210, the second diagonal line 212, and the third diagonal line 214 are defined as lines with a diagonal orientation. The first diagonal line 210, the second diagonal line 212, and the third diagonal line 214 are non-parallel with the x-axis 134 of FIG. 1 and the y-axis 136 of FIG. 1.

Figure 3:
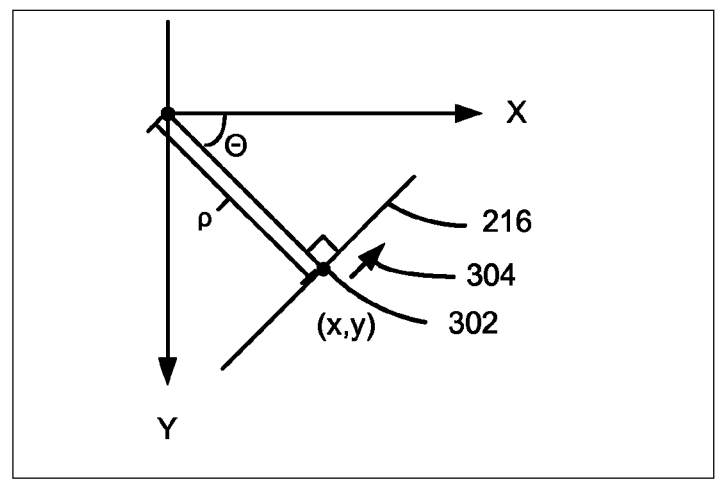
FIG. 3 is an example of a line segment.

Referring now to FIG. 3, therein is shown an example of the line segment 216. The line segment 216 can represent a portion of a line represented in the edge pixel image 202 of FIG. 2.

The edge pixel image 202 is an array of pixels arranged in rows and columns. A pixel is defined as a picture element that has a color and a location and represents a portion of an image. Each pixel in the edge pixel image 202 can be represented in a Cartesian coordinate system with an x-coordinate representing the column and a y-coordinate representing the row. Pixels that represent the presence of a line have an "on" or positive value. Pixels representing the space between lines have an "off" or zero value. Each pixel representing the presence of a line is an edge pixel 302.

The edge pixel 302 is defined as a picture element that represents the presence of a line at the location of the edge pixel 302, where the edge pixel 302 has a non-zero value. The edge pixel 302 can include the line segment 216. The line segment 216 can be a representation of the edge pixel 302 expressed in a polar coordinate system.

The line segment 216 can have a location and an edge direction 304. The location of the line segment 216 is defined as the row and column coordinate of the line segment 216 in the edge pixel image 202. The edge direction 304 is defined as the direction of the line represented by the line segment 216 where the line segment 216 is located.

The line segment 216 can be represented in a polar coordinate notation using rho and theta, where rho is the nominal perpendicular distance from the line segment 216 to the origin of the edge pixel image 202 and theta is the angle between the positive x-direction and a perpendicular line connecting the line segment 216 to the origin. Representing each edge pixel in polar coordinate notation using rho and theta is representing the edge pixels in rho-theta space.

For example, the edge pixel 302 at location (x, y) can represent the line segment 216 at location (x, y) in the edge pixel image 202. The line segment 216 can be represented by a polar coordinate ($\rho$ (rho), $\theta$ (theta)). The line segment 216 can be represented by the equation:

$$\rho = x \cdot \cos\theta + y \cdot \sin\theta \qquad (1)$$

Figure 4:
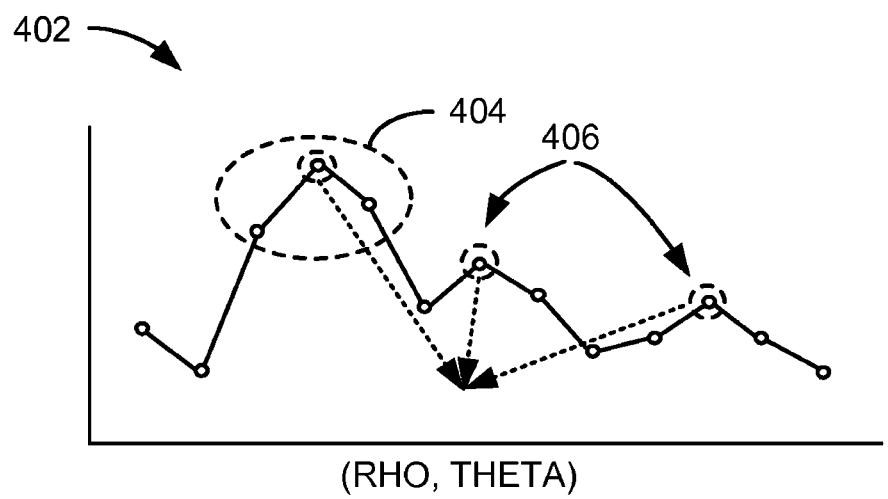
FIG. 4 is an example of a line histogram.

Referring now to FIG. 4, therein is shown an example of a line histogram 402. The line histogram 402 can be generated from the edge pixel image 202 of FIG. 2 and can represent the number of the line segment 216 of FIG. 2 that forms a particular line.

The line histogram 402 is defined as a representation of the distribution of the line segment 216 in the edge pixel image 202. The line histogram 402 can be represented using polar coordinates, rho and theta. For example, the line histogram 402 can be represented by a two dimensional bar chart where the horizontal axis represents locations in the edge pixel image 202 and the vertical axis represents the number of the line segment 216 at those locations. Each location can be represented by a rho and theta pair.

The line histogram 402 can include a counter value for each of the line segment 216 with a particular rho and theta value. Thus, as an example, the line histogram 402 can represent the number of the line segment 216 that lies on the same line.

The line histogram 402 can represent the distribution of lines in the edge pixel image 202. The line histogram 402 can include a global maxima 404 and a local maxima 406. The global maxima 404 is defined as the position in the line histogram 402 having the highest value or highest count of the line segment 216 for a particular combination of rho and theta. The local maxima 406 is defined as a position in the line histogram 402 that has a higher value than adjacent positions in the line histogram 402.

The line histogram 402 can include one or more of the local maxima 406 representing different lines. The local maxima 406 can represent the number of the line segment 216 that have a similar orientation and position as represented their rho and theta values.

Figure 5:
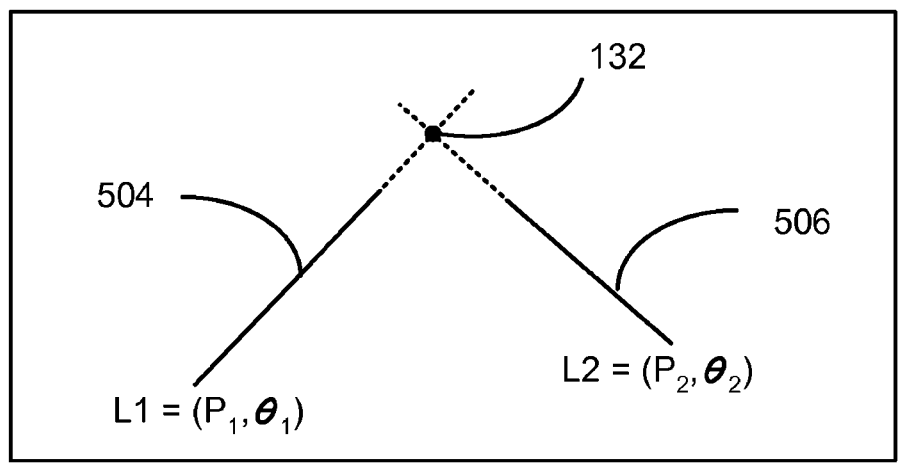
FIG. 5 is an example of the vanishing point.

Referring now to FIG. 5, therein is shown an example of a vanishing point 132. The vanishing point 132 is a point in the source image 130 of FIG. 1 where a first vanishing line 504 and a second vanishing line 506 converge.

The vanishing point 132 is defined as a point where parallel lines in a perspective image converge. The vanishing point 132 can represents point with the greatest depth in the source image 130. For example, the vanishing point 132 can represent the point where the two lines representing the side of a road meet at the horizon.

The first vanishing line 504 is defined as a straight line detected in the source image 130 that represents the edge of an object. The second vanishing line 506 is defined as a straight line detected in the source image 130 that represents the edge of an object.

The first vanishing line 504 can be represented in polar coordinate using a distance rho ($\rho_1$) and an angle $\theta_1$ (theta). The second vanishing line 506 can be represented in polar coordinate using a distance $\rho_2$ (rho$_2$) and an angle $\theta_2$ (theta$_2$).

Figure 6:
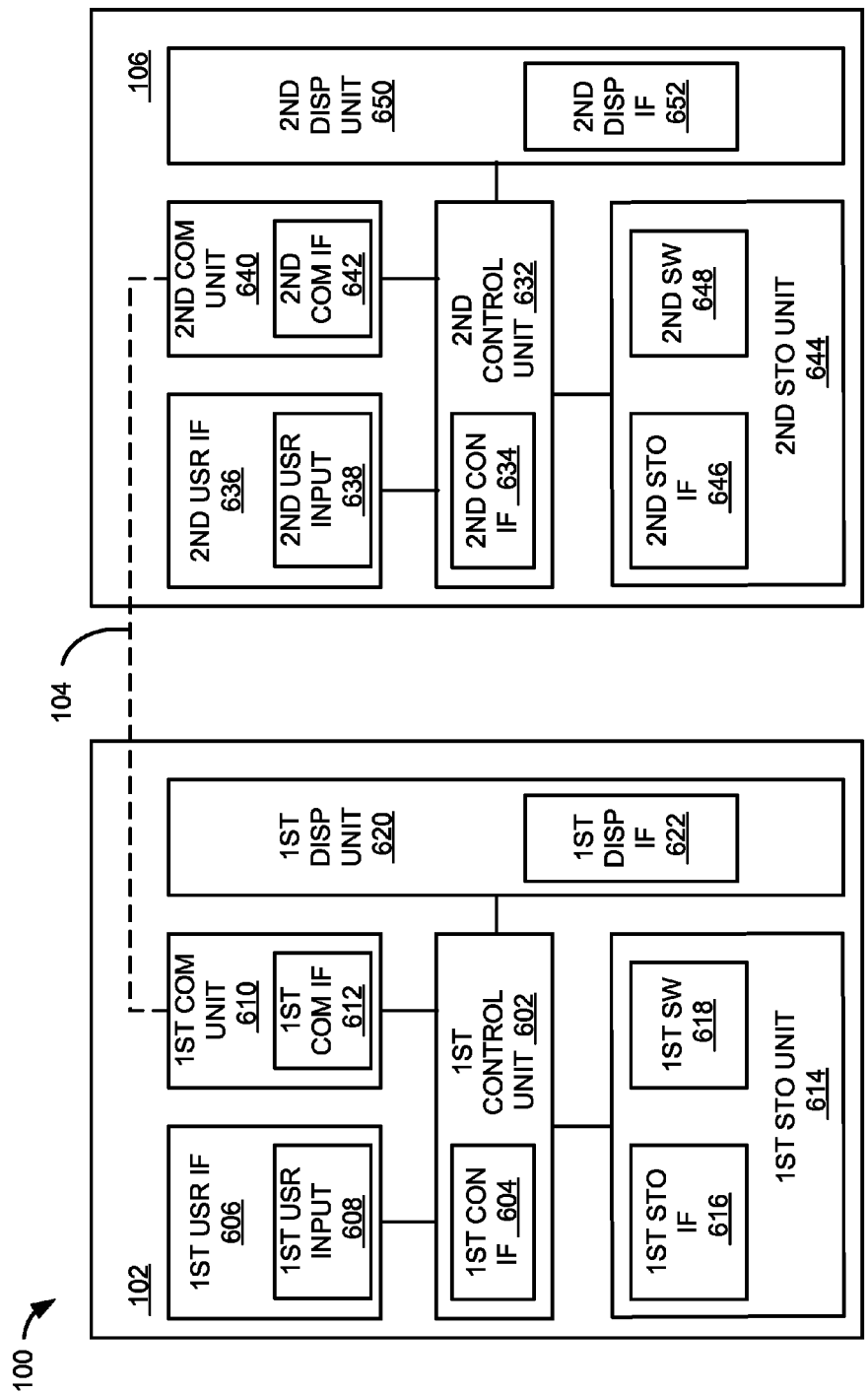
FIG. 6 is an exemplary block diagram of the three-dimensional display system.

Referring now to FIG. 6, therein is shown an exemplary block diagram of the three-dimensional display system 100. The three-dimensional display system 100 can include the first device 102 with a first display unit 620. The first device 102 can receive information for display on the first display unit 620. The first device 102 can send information over the communication path 104 to the second device 106. The second device 106 can send information over the communication path 104 to the first device 102.

For illustrative purposes, the three-dimensional display system 100 is shown with the first device 102 as a client device displaying the three-dimensional image 140 of FIG. 1 although it is understood that the three-dimensional display system 100 can have the first device 102 as a different type of device. For example, the first device can be a server.

Also for illustrative purposes, the three-dimensional display system 100 is shown with the second device 106 as a server device displaying the three-dimensional image 140, although it is understood that the three-dimensional display system 100 can have the second device 106 as a different type of device. For example, the second device 106 can be a client device.

In another example, the first device 102 and the second device 106 can be a projection television, a liquid crystal display, digital movie projector, tablet computer, cell phone, gaming device, a wearable stereoscopic display system, server, PC, PDA, or a combination thereof.

For brevity of description in this embodiment of the present invention, the first device 102 will be described as a client device. The present invention is not limited to this selection for the type of devices. The selection is an example of the present invention.

The first device 102 can include a first control unit 602, a first storage unit 614, a first communication unit 610, a first user interface 606, and the first display unit 620. The first control unit 602 can include a first control interface 604. The first control unit 602 can execute a first software 618 to provide the intelligence of the three-dimensional display system 100.

The first control unit 602 can be implemented in a number of different manners. For example, the first control unit 602 can be a processor, an embedded processor, a microprocessor, a hardware control logic, a hardware finite state machine (FSM), a digital signal processor (DSP), or a combination thereof. The first control interface 604 can be used for communication between the first control unit 602 and other functional units in the first device 102. The first control interface 604 can also be used for communication that is external to the first device 102.

The first control interface 604 can receive information from the other functional units or from external sources, or can transmit information to the other functional units or to external destinations. The external sources and the external destinations refer to sources and destinations external to the first device 102.

The first control interface 604 can be implemented in different ways and can include different implementations depending on which functional units or external units are being interfaced with the first control interface 604. For example, the first control interface 604 can be implemented with electrical circuitry, microelectromechanical systems (MEMS), optical circuitry, wireless circuitry, wireline circuitry, or a combination thereof.

The first display unit 620 can display the three-dimensional image 140 either directly or by projection on a display surface. The first display unit 620 can include a projector unit, a digital display unit, a liquid crystal display unit, an organic light emitting diode display, active display glasses, or any combination thereof.

The first display unit 620 can include a first display interface 622. The first display interface 622 can be used for communication between the first display unit 620 and other functional units in the first device 102.

The first display interface 622 can receive information from the other functional units or from external sources, or can transmit information to the other functional units or to external destinations. The external sources and the external destinations refer to sources and destinations external to the first device 102.

The first display interface 622 can include different implementations depending on which functional units or external units are being interfaced with the first display unit 620. The first display interface 622 can be implemented with technologies and techniques similar to the implementation of the first control interface 604.

The first storage unit 614 can store the first software 618. The first storage unit 614 can also store the relevant information, such as images, video, gradient information, image profile, geometry information, or any combination thereof.

The first storage unit 614 can be a volatile memory, a nonvolatile memory, an internal memory, an external memory, or a combination thereof. For example, the first storage unit 614 can be a nonvolatile storage such as nonvolatile random access memory (NVRAM), Flash memory, disk storage, or a volatile storage such as static random access memory (SRAM).

The first storage unit 614 can include a first storage interface 616. The first storage interface 616 can be used for communication between the first control unit 602 and other functional units in the first device 102. The first storage interface 616 can also be used for communication that is external to the first device 102.

The first storage interface 616 can receive information from the other functional units or from external sources, or can transmit information to the other functional units or to external destinations. The external sources and the external destinations refer to sources and destinations external to the first device 102.

The first storage interface 616 can include different implementations depending on which functional units or external units are being interfaced with the first storage unit 614. The first storage interface 616 can be implemented with technologies and techniques similar to the implementation of the first control interface 604.

The first communication unit 610 can enable external communication to and from the first device 102. For example, the first communication unit 610 can permit the first device 102 to communicate with the second device 106, an attachment, such as a peripheral device or a computer desktop, and the communication path 104.

The first communication unit 610 can also function as a communication hub allowing the first device 102 to function as part of the communication path 104 and not limited to be an end point or terminal unit to the communication path 104. The first communication unit 610 can include active and passive components, such as microelectronics or an antenna, for interaction with the communication path 104.

The first communication unit 610 can include a first communication interface 612. The first communication interface 612 can be used for communication between the first communication unit 610 and other functional units in the first device 102. The first communication interface 612 can receive information from the other functional units or can transmit information to the other functional units.

The first communication interface 612 can include different implementations depending on which functional units are being interfaced with the first communication unit 610. The first communication interface 612 can be implemented with technologies and techniques similar to the implementation of the first control interface 604.

The first user interface 606 allows a user (not shown) to interface and interact with the first device 102. The first user interface 606 can include a first user input 608. The first user input 608 can include a buttons, sliders, knobs, virtual buttons, voice recognition controls, or any combination thereof.

The first control unit 602 can operate the first user interface 606 to display information generated by the three-dimensional display system 100 on the first display unit 620. The first control unit 602 can also execute the first software 618 for the other functions of the three-dimensional display system 100, including receiving display information from the first storage unit 614 for display on the first display unit 620. The first control unit 602 can further execute the first software 618 for interaction with the communication path 104 via the first communication unit 610.

The three-dimensional display system 100 can include the second device 106. The second device 106 can be optimized for implementing the present invention in a multiple device embodiment with the first device 102. The second device 106 can provide the additional or higher performance processing power compared to the first device 102.

The second device 106 can include a second control unit 632, a second storage unit 644, a second communication unit 640, a second user interface 636, and a second display unit 650. The second control unit 632 can include a second control interface 634.

The second control unit 632 can execute a second software 648 to provide the intelligence of the three-dimensional display system 100. The second software 648 can operate in conjunction with the first software 618. The second control unit can provide additional performance compared to the first control unit 602.

The second control unit 632 can be implemented in a number of different manners. For example, the second control unit 632 can be a processor, an embedded processor, a microprocessor, a hardware control logic, a hardware finite state machine (FSM), a digital signal processor (DSP), or a combination thereof. The second control interface 634 can be used for communication between the second control unit 632 and other functional units in the second device 106. The second control interface 634 can also be used for communication that is external to the second device 106.

The second control interface 634 can receive information from the other functional units or from external sources, or can transmit information to the other functional units or to external destinations. The external sources and the external destinations refer to sources and destinations external to the second device 106.

The second control interface 634 can be implemented in different ways and can include different implementations depending on which functional units or external units are being interfaced with the second control interface 634. For example, the second control interface 634 can be implemented with electrical circuitry, microelectromechanical systems (MEMS), optical circuitry, waveguides, wireless circuitry, wireline circuitry, or a combination thereof.

The second display unit 650 can display the three-dimensional image 140 either directly or by projection on a display surface. The second display unit 650 can include a projector unit, a digital display unit, a liquid crystal display unit, an organic light emitting diode display, active display glasses, or any combination thereof.

The second display unit 650 can include a second display interface 652. The second display interface 652 can be used for communication between the second display unit 650 and other functional units in the second device 106.

The second display interface 652 can receive information from the other functional units or from external sources, or can transmit information to the other functional units or to external destinations. The external sources and the external destinations refer to sources and destinations external to the second device 106.

The second display interface 652 can include different implementations depending on which functional units or external units are being interfaced with the second display unit 650. The second display interface 652 can be implemented with technologies and techniques similar to the implementation of the second control interface 634.

The second storage unit 644 can store the second software 648. The second storage unit 644 can also store relevant information, such as images, video, gradient information, image profile, geometry information, or any combination thereof. The second storage unit 644 can be sized to provide additional storage capacity to supplement the first storage unit 614.

The second storage unit 644 can be a volatile memory, a nonvolatile memory, an internal memory, an external memory, or a combination thereof. For example, the second storage unit 644 can be a nonvolatile storage such as nonvolatile random access memory, Flash memory, disk storage, or a volatile storage such as static random access memory.

The second storage unit 644 can include a second storage interface 646. The second storage interface 646 can be used for communication between the second display unit 650 and other functional units in the second device 106. The second storage interface 646 can also be used for communication that is external to the second device 106.

The second storage interface 646 can receive information from the other functional units or from external sources, or can transmit information to the other functional units or to external destinations. The external sources and the external destinations refer to sources and destinations external to the second device 106.

The second storage interface 646 can include different implementations depending on which functional units or external units are being interfaced with the second storage unit 644. The second storage interface 646 can be implemented with technologies and techniques similar to the implementation of the second control interface 634.

The second communication unit 640 can enable external communication to and from the second device 106. For example, the second communication unit 640 can permit the second device 106 to communicate with the first device 102 over the communication path 104.

The second communication unit 640 can also function as a communication hub allowing the second device 106 to function as part of the communication path 104 and not limited to be an end point or terminal unit to the communication path 104. The second communication unit 640 can include active and passive components, such as microelectronics or an antenna, for interaction with the communication path 104.

The second communication unit 640 can include a second communication interface 642. The second communication interface 642 can be used for communication between the second communication unit 640 and other functional units in the second device 106. The second communication interface 642 can receive information from the other functional units or can transmit information to the other functional units.

The second communication interface 642 can include different implementations depending on which functional units are being interfaced with the second communication unit 640. The second communication interface 642 can be implemented with technologies and techniques similar to the implementation of the second control interface 634.

The first communication unit 610 can couple with the communication path 104 to send information to the second device 106. The second device 106 can receive information in the second communication unit 640.

The second communication unit 640 can couple with the communication path 104 to send information to the first device 102. The first device 102 can receive information in the first communication unit 610.

The second user interface 636 allows a user (not shown) to interface and interact with the second device 106. The second user interface 636 can include a second user input 638 and an output device. The second user input 638 can include a buttons, sliders, knobs, virtual buttons, voice recognition controls, or any combination thereof.

The second control unit 632 can operate the second user interface 636 to display information generated by the three-dimensional display system 100. The second control unit 632 can also execute the second software 648 for the other functions of the three-dimensional display system 100, including receiving display information from the second display unit 650. The second control unit 632 can further execute the second software 648 for interaction with the communication path 104 via the second communication unit 640.

For illustrative purposes, the second device 106 can be partitioned having the second user interface 636, the second storage unit 644, the second control unit 632, and the second communication unit 640, although it is understood that the second device 106 can have a different partition. For example, the second software 648 can be partitioned differently such that some or all of its function can be in the second control unit 632 and the second communication unit 640. Also, the second device 106 can include other functional units not shown in FIG. 6 for clarity.

The functional units in the first device 102 can work individually and independently of the other functional units. For illustrative purposes, the three-dimensional display system 100 is described by operation of the first device 102. It is understood that the first device 102 can operate any of the modules and functions of the three-dimensional display system 100. For example, the first device 102 can be described to operate the first display unit 620.

The functional units in the second device 106 can work individually and independently of the other functional units. For illustrative purposes, the three-dimensional display system 100 is described by operation of the second device 106. It is understood that the second device 106 can operate any of the modules and functions of the three-dimensional display system 100. For example, the second device 106 is described to operate the second display unit 650.

For illustrative purposes, the three-dimensional display system 100 is described by operation of the first device 102 and the second device 106. It is understood that the first device 102 and the second device 106 can operate any of the modules and functions of the three-dimensional display system 100. For example, the first device 102 is described to operate the second display unit 650, although it is understood that the second device 106 can also operate the second display unit 650.

Figure 7:
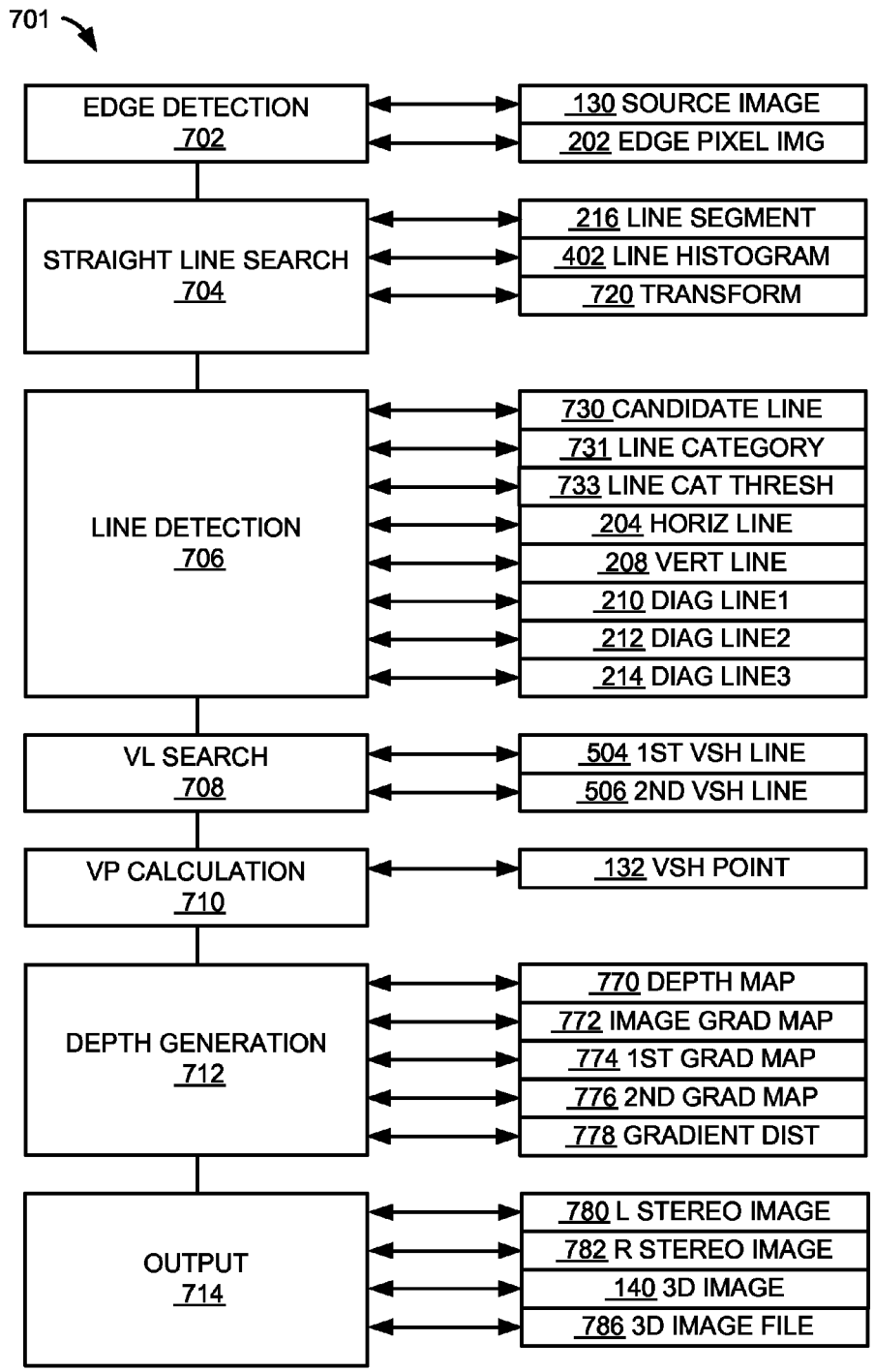
FIG. 7 is a control flow of the three-dimensional display system.

Referring now to FIG. 7, therein is shown a control flow 701 of the three-dimensional display system 100 of FIG. 1. The three-dimensional display system 100 can receive the source image 130 and display the three-dimensional image 140 of FIG. 1 on the first device 102 of FIG. 1.

The three-dimensional display system 100 can include an edge detection module 702 to calculate the edge pixel image 202. The three-dimensional display system 100 can include a straight line search module 704 to generate the line histogram 402. The three-dimensional display system 100 can include a line detection module 706 to detect straight lines in the edge pixel image 202. The three-dimensional display system 100 can include a vanishing line search module 708 to identify the first vanishing line 504 and the second vanishing line 506.

The three-dimensional display system 100 can include a vanishing point calculation module 710 to calculate the vanishing point 132 from the first vanishing line 504 and the second vanishing line 506. The three-dimensional display system 100 can include a depth generation module 712 to generate a depth map 770. The three-dimensional display system 100 can include an output module 714 to render the three-dimensional image 140.

In the control flow 701 of the three-dimensional display system 100 as an example, each module is indicated by a number and successively higher module numbers follow one another. Control flow can pass from one module to the next higher numbered module unless explicitly otherwise indicated.

The three-dimensional display system 100 can include the edge detection module 702. The edge detection module 702 is defined as a module to calculate the edge pixel image 202. The edge detection module 702 can perform feature detection operations on the source image 130 to calculate the edge pixel image 202. The edge detection module 702 can pass the control flow to the straight line search module 704.

The edge pixel image 202 can be calculated by applying an edge detection operation that can detect the edges of objects in the source image 130. For example, edges can include sharp changes in image brightness or color that indicates the boundary between objects in the source image 130. The edge detection process is described in detail later.

The edge pixel image 202 can represent lines by the presence of pixels with a value indicating an edge in the same location in the edge pixel image 202 where the edge exists in the source image 130. For example, the edge pixel image 202 can have a pixel with value one where there is an edge in the source image 130. The edge pixel image 202 can have a pixel with a value zero where there is no edge detected in the source image 130.

In another example, the edge pixel image 202 that can include pixel information that represents horizontal lines, vertical lines, diagonal lines, or a combination thereof. Horizontal lines can represent the edges of a variety of objects including a horizon, the top of a building, streets, windows, or a combination thereof. Vertical lines can represent the edges of a variety of objects including poles, sides of buildings, streets, windows, doors, or any combination thereof. Diagonal lines can represent the edges of a variety of objects such as streets extending into the scene, building perspectives, landscape features, or a combination thereof.

The three-dimensional display system 100 can include the straight line search module 704. The straight line search module 704 is defined as a module to generate the line histogram 402. The straight line search module 704 can process the edge pixel image 202 and identify the straight lines represented in the edge pixel image 202. The straight line search module 704 can apply a transform 720 to the edge pixel image 202 to generate the line histogram 402. The straight line search module 704 can pass control flow to the line detection module 706. The straight line search process is described in detail in a later section.

The three-dimensional display system 100 can include the line detection module 706. The line detection module 706 is defined as a module to calculate a candidate line 730 representing a straight line in the line histogram 402. The candidate line 730 is defined as a line identified in the line histogram 402 that can be in the category of a horizontal line, a vertical line, or a diagonal line. The candidate line 730 can represent a variety of lines including the horizontal line 204, the vertical line 208, the first diagonal line 210, the second diagonal line 212, and the third diagonal line 214. The line detection module 706 can pass control flow to the vanishing line search module 708.

The line detection module 706 can calculate the candidate line 730 from the line histogram 402 by identifying the local maxima 406 of FIG. 4 with a value greater than a pre-determined value of a line category threshold 733. The line category threshold 733 is defined as a pre-determined value that can define a line category 731. For example, the line category threshold 733 for a horizontal line is pre-defined value for a range of rho-theta values where theta indicates that the line segment 216 is a horizontal line. If the local maxima 406 in the line histogram 402 for a particular range rho-theta values indicating a horizontal line is above a pre-defined level then the candidate line 730 for the local maxima 406 can be designated a horizontal line.

The line category 731 is defined as a type of line. The line category 731 can include horizontal lines, vertical lines, diagonal lines, or a combination thereof. For each different value for the line category 731, there can be an associated value of the line category threshold 733.

For example, the line category 731 representing a horizontal line can have the line category threshold 733 set to a pre-determined threshold value to identify a horizontal line. The entries in the line histogram 402 that have a high enough histogram value can be identified as the candidate line 730 for the line category 731 representing a horizontal line.

In another example, the line category 731 representing a vertical line can have the line category threshold 733 set to a pre-determined threshold value to identify a vertical line. The entries in the line histogram 402 that have a high enough histogram value can be identified as the candidate line 730 for the line category 731 representing a vertical line.

In yet another example, the line category 731 representing a diagonal line can have the line category threshold 733 set to a pre-determined threshold value to identify a diagonal line. The entries in the line histogram 402 that have a high enough histogram value can be identified as the candidate line 730 for the line category 731 representing a diagonal line.

The line detection module 706 can calculate the candidate line 730 for different values of the line category 731 including the horizontal line 204, the vertical line 208, the first diagonal line 210, the second diagonal line 212, and the third diagonal line 214. In addition, based on the edge pixel image 202, it is possible for one or more of the candidate line 730 to be set to a null value indicating that there was no line of that type in the edge pixel image 202. The line detection module 706 is described in further detail in a later section.

It has been discovered that the present invention provides the three-dimensional display system 100 with improved detection of the candidate line 730 in the source image 130. By using the pre-determined value of the line category threshold 733 with the line histogram 402 to identify the candidate line 730 from the edge pixel image 202 can reduce the amount of time required to find the candidate line 730. Because of the large number of entries and combinations in the line histogram 402, the use of the line category threshold 733 to identify the candidate line 730 provides an improved method of finding the candidate line 730 using less compute time and less computer storage. As a result, the candidate line 730 can be used can increase the number of lines that can be identified in a given period of time.

The three-dimensional display system 100 can include the vanishing line search module 708. The vanishing line search module 708 is defined as a module to identify the first vanishing line 504 and the second vanishing line 506 based on the presence or absence of the candidate line 730 for different combinations of the line category 731. The first vanishing line 504 and the second vanishing line 506 can represent two edges in the edge pixel image 202 that converge on the vanishing point 132 representing the deepest depth in the source image 130. The vanishing line search module 708 can pass control flow to the vanishing point calculation module 710.

The vanishing line search module 708 can identify the first vanishing line 504 and the second vanishing line 506 based on different sets of criteria defined by the availability of the candidate line 730 for various types of the line category 731. This corresponds to selection criteria for the vanishing lines based on the type of lines that were detected in the edge pixel image 202. The set of detected lines can include the horizontal line 204, the vertical line 208, the first diagonal line 210, the second diagonal line 212, and the third diagonal line 214, or a subset thereof.

The vanishing line search module 708 can calculate the first vanishing line 504 and the second vanishing line 506 for different pre-defined combinations of lines making up the set of detected lines. The detail of the vanishing line calculation for each combination is detailed in later sections.

For example, if the set of detected lines includes the horizontal line 204, the vertical line 208, the first diagonal line 210, the second diagonal line 212, and the third diagonal line 214, then the first vanishing line 504 and the second vanishing line 506 can be calculated based on the properties of all five line types.

In a second example, if the set of detected lines includes only the horizontal line 204, the first diagonal line 210, the second diagonal line 212, and the third diagonal line 214, then the first vanishing line 504 and the second vanishing line 506 can be calculated based on the properties of the four available line types.

In a third example, if the set of detected lines includes only the horizontal line 204, the vertical line 208, the first diagonal line 210, and the second diagonal line 212, then the first vanishing line 504 and the second vanishing line 506 can be calculated based on the properties of the four line types.

In a fourth example, if the set of detected lines includes only the horizontal line 204, the first diagonal line 210, and the second diagonal line 212, then the first vanishing line 504 and the second vanishing line 506 can be calculated based on the properties of the three line types.

In a fifth example, if the set of detected lines includes only the horizontal line 204, the vertical line 208, and the first diagonal line 210, then the first vanishing line 504 and the second vanishing line 506 can be calculated based on the properties of the three line types.

In a sixth example, if the set of detected lines includes only the horizontal line 204, and the first diagonal line 210, then the first vanishing line 504 and the second vanishing line 506 can be calculated based on the properties of the two line types.

It has been discovered that the present invention provides the three-dimensional display system 100 with at least two times improved calculation of the first vanishing line 504 and the second vanishing line 506. The vanishing line search module 708 can simplify the calculation of the first vanishing line 504 and the second vanishing line 506 by using a pre-defined set of detected lines. Calculating the first vanishing line 504 and the second vanishing line 506 can be computationally intense and requires large amounts of time, so pre-defining the set of the detected lines can reduce the amount of time required to generate the vanishing point 132 on the order of several times less. By simplifying the calculation of the first vanishing line 504 and the second vanishing line 506, the real-time performance of generating the depth map 770 can be improved.

The three-dimensional display system 100 can include the vanishing point calculation module 710. The vanishing point calculation module 710 is defined as a module to calculate the vanishing point 132 when the first vanishing line 504 and the second vanishing line 506 have been identified. The vanishing point 132 representing the deepest depth in the source image 130 based on the edges identified in the edge pixel image 202. The vanishing point calculation module 710 can pass control flow to the depth generation module 712.

The vanishing point calculation module 710 can calculate the vanishing point 132 based on the relationship between the first vanishing line 504 and the second vanishing line 506, given that the two vanishing lines are not parallel. The vanishing point 132 represents the location where the first vanishing line 504 and the second vanishing line 506 intersect. The vanishing point 132 can be calculated using the equation:

$$VP = \begin{pmatrix} VP_x \\ VP_y \end{pmatrix} = \begin{pmatrix} \frac{r_1 \sin\theta_2 - r_2 \sin\theta_1}{\cos\theta_1 \sin\theta_2 - \sin\theta_1 \cos\theta_2} \\ \frac{r_1 \cos\theta_2 - r_2 \cos\theta_1}{\cos\theta_1 \sin\theta_2 - \sin\theta_1 \cos\theta_2} \end{pmatrix} \quad (2)$$

Where the first vanishing line 504 is represented by the tuple $(r_1, \theta_1)$ and the second vanishing line 506 is represented by $(r_2, \theta_2)$.

The three-dimensional display system 100 can include the depth generation module 712. The depth generation module 712 is defined as a module to generate the depth map 770 for the source image 130 based on the vanishing point 132 identified in the vanishing point calculation module 710 and an image gradient map 772. The depth generation module 712 can pass control flow to the output module 714.

The depth map 770 can represent the apparent depth of each pixel in the source image 130. The apparent depth is defined as the distance of a pixel relative to the front of the image as perceived in the three-dimensional image 140 of FIG. 1. The depth map 770 can be generated by combining the depth of the vanishing point 132 with the image gradient map 772 to determine the apparent depth of each pixel relative to the vanishing point 132. The image gradient map 772 is defined as a rectangular array of elements with the same dimensions as the source image 130 where each array element (x, y) indicates the relative depth of the corresponding pixel in the source image 130 relative the adjacent pixels. The apparent depth of the vanishing point 132 can be determined by a pre-defined value based on the scene type. For example, the scene type can be classified into a few categories, such as outdoor, indoor, or a combination thereof.

The image gradient map 772 can indicate the relative depth of each pixel in the source image 130 as compared to the other pixels in the source image 130. The image gradient map 772 can indicate the relative depth of each pixel based on the rate of change of depth over a region. The rate of change of depth over a region is represented by a gradient distribution 778.

The image gradient map 772 can be calculated by combining a first gradient map 774 with a second gradient map 776. The image gradient map 772 can be calculated in a variety of methods including a horizontal gradient map, a combination gradient map based on a vanishing point and a rhombus shaped depth distribution, a hybrid gradient map based on a combination of other gradient maps, or a combination thereof. The detail of the calculation of the image gradient map 772 are provided in a later section.

The three-dimensional display system 100 can include the output module 714. The output module 714 is defined as a module to combine the depth map 770 and the source image 130 to generate a three-dimensional representation of the source image 130 on the first display unit 620 of FIG. 6.

The depth map 770 can be combined with the source image 130 to generate the three-dimensional image 140 of the source image 130 by generating a left stereo image 780 and a right stereo image 782 for the left and right eye, respectively, that can be viewed together to form a stereoscopic image of the source image 130. The three-dimensional image 140 can include the left stereo image 780 and the right stereo image 782.

The left stereo image 780 is defined as the image presented to the left eye used to display a stereoscopic three-dimensional image. The right stereo image 782 is defined as the image presented to the right eye used to display a stereoscopic three-dimensional image.

The left stereo image 780 and the right stereo image 782 can be calculated by determining a left or right displacement for each pixel in the source image 130 based on the depth indicated in the depth map 770 for that pixel and the value representing the intraocular separation between the eyes of the viewer. The left stereo image 780 and the right stereo image 782 can be calculated by determining the location of the pixels of the source image 130 as they would appear from the left or right eye respectively. The left stereo image 780 and the right stereo image 782 are generated by rendering the source image 130 using the depth map 770 to determine the left and right offset for each pixel.

The three-dimensional display system 100 can calculate and display the left stereo image 780 and the right stereo image 782 to generate the three-dimensional representation of the source image 130. For example, the three-dimensional display system 100 can display the left stereo image 780 and the right stereo image 782 in an alternating fashion at the video refresh rate to allow the viewing of the three-dimensional image using shutter glasses. In another example, the three-dimensional display system 100 can display the left stereo image 780 using horizontally polarized light and the right stereo image 782 using vertically polarized light to allow viewing of the three-dimensional image using polarized viewing glasses.

The physical transformation from generating the three-dimensional representation of the source image 130 can result in the creation of the left stereo image 780 and the right stereo image 782 stored in a permanent file in the first storage unit 614 of FIG. 6 of the three-dimensional display system 100. The left stereo image 780 and the right stereo image 782 are transformations of the source image 130 that have been rendered into a left-eye image and right-eye image, respectively, and stored in a non-transitory image file on the first storage unit 614. This results in the creation of a three-dimensional image file 786 on the first storage unit 614 which can cause the manipulation of the disk drive and the disk drive head unit of the first storage unit 614, as well as the magnetization or phase change of material on the disk platter. Although a disk drive is discussed as the first storage unit 614, it is understood that the first storage unit 614 can include other storage media including optical disk, flash memory, charge-coupled devices, solid-state memory, or any combination thereof. In addition, the first storage unit 614 can also include the second storage unit 644 of FIG. 6. As the transformation occurs in the physical world, the transformation itself creates additional information that can be used for the continued operation of the three-dimensional display system 100 and to continue the transformation in the physical world.

Another physical transformation from generating the three-dimensional representation of the source image 130 is the creation of a three-dimensional image on the first display unit 620 of FIG. 6. The left stereo image 780 and the right stereo image 782 are combined and displayed on the first display unit 620 resulting in the rapid switching of the two images and the coordinated shutter action on the shutter glasses used to display the three-dimensional image. In addition, the display of the left stereo image 780 and the right stereo image 782 causes the physical transformation of activating the display pixel elements used to display or project the image. This can include liquid crystal display (LCD) elements, plasma display elements, phosphor display elements, or any combination thereof. As the transformation occurs in the physical world, the transformation itself creates additional information about the left stereo image 780 and the right stereo image 782 for the continued operation of the three-dimensional display system 100 and to continue the transformation in the physical world.

Yet another physical transformation from displaying the image three-dimensional image 140 results in movement in the physical world, such as people moving in response to the three-dimensional image 140 when playing games or viewing a three-dimensional image. The first display unit 620 can display the three-dimensional image 140 by manipulating the pixels on the first device 102, thus resulting in movement in the physical world.

The first software 618 of FIG. 6 of the first device 102 of FIG. 1 can include the three-dimensional display system 100. For example, the first software 618 can include the edge detection module 702, the straight line search module 704, the line detection module 706, the vanishing line search module 708, the vanishing point calculation module 710, the depth generation module 712, and the output module 714.

The three-dimensional display system 100 or the modules thereof can be implemented as functional units in the hardware block diagram of FIG. 6. The modules can be implemented in software, hardware, firmware, or a combination thereof.

The first control unit 602 of FIG. 6 can execute the first software 618 for the edge detection module 702 to calculate the edge pixel image 202 from the source image 130. The first control unit 602 can execute the first software 618 for the straight line search module 704 to identify the lines in the edge pixel image 202. The first control unit 602 can execute the first software 618 for the line detection module 706 to generate the line histogram 402 for the candidate line 730.

The first control unit 602 can execute the first software 618 for the vanishing line search module 708 to identify the first vanishing line 504 and the second vanishing line 506. The first control unit 602 can execute the first software 618 for the vanishing point calculation module 710 to calculate the vanishing point 132. The first control unit 602 can execute the first software 618 for the depth generation module 712 to generate the depth map 770. The first control unit 602 can execute the first software 618 for the output module 714 to render and display the three-dimensional image 140.

The second software 648 of FIG. 6 of the second device 106 of FIG. 1 can include the three-dimensional display system 100. For example, the second software 648 can include the edge detection module 702, the straight line search module 704, the line detection module 706, the vanishing line search module 708, the vanishing point calculation module 710, the depth generation module 712, and the output module 714.

The second control unit 632 of FIG. 6 can execute the second software 648 for the edge detection module 702 to calculate the edge pixel image 202 from the source image 130. The second control unit 632 can execute the second software 648 for the straight line search module 704 to identify the lines in the edge pixel image 202. The second control unit 632 can execute the second software 648 for the line detection module 706 to generate the line histogram 402 for the candidate line 730.

The second control unit 632 can execute the second software 648 for the vanishing line search module 708 to identify the second vanishing line 506 and the second vanishing line 506. The second control unit 632 can execute the second software 648 for the vanishing point calculation module 710 to calculate the vanishing point 132. The second control unit 632 can execute the second software 648 for the depth generation module 712 to generate the depth map 770. The second control unit 632 can execute the second software 648 for the output module 714 to render and display the three-dimensional image 140.

The three-dimensional display system can be partitioned between the first software 618 and the second software 648. For example, the first software 618 can include the edge detection module 702, the straight line search module 704, the line detection module 706, the vanishing line search module 708, the vanishing point calculation module 710, the depth generation module 712, the output module 714, or any combination thereof. The first control unit 602 can execute modules partitioned on the second software 648 as previously described.

In a further example, the second software 648 can include the edge detection module 702, the straight line search module 704, the line detection module 706, the vanishing line search module 708, the vanishing point calculation module 710, the depth generation module 712, the output module 714, or any combination thereof. The second control unit 632 can execute modules partitioned on the second software 648 as previously described.

The first software 618 can include the edge detection module 702 and the straight line search module 704. Based on the size of the first storage unit 614, the first software 618 can include additional modules of the three-dimensional display system 100. The first control unit 602 can execute the modules partitioned on the first software 618 as previously described.

The first user interface 606 of FIG. 6 can receive the command input by the user, the three-dimensional display system 100, or a combination thereof. The first control unit 602 can operate the first communication unit 610 of FIG. 6 to send the command input to the second device 106.

The second communication unit 640 of FIG. 6 can send the three-dimensional image 140 to the first device 102 through the communication path 104 of FIG. 1. The three-dimensional image 140 can be displayed on the first display unit 620.

It has been discovered that the present invention provides the three-dimensional display system 100 with an improved means to generate the depth map 770 for representing the physical distribution of real-world objects in the three dimensional scene represented by the source image 130. The first device 102 and the second device 106 can calculate the first vanishing line 504 and the second vanishing line 506, and the vanishing point 132 which can be combined to generate the three-dimensional representation of the source image 130 with the depth map 770. The ability to generate the three-dimensional image 140 from the first device 102 and the second device 106 can overcome the shortcomings of generating the three-dimensional image 140 from only a single device. As a result, the speed, accuracy, and quality of the three-dimensional image 140 can improve.

It has also been discovered that the present invention provides the three-dimensional display system 100 with improved battery life of up to 50% for consumer units, such as the first device 102 for example. The three-dimensional image 140 and the shared access to the three-dimensional image 140 in the second storage unit 644 give rise to the benefit by generating the three-dimensional image 140 on the second device 106 rather than generating the three-dimensional image 140 on the first device 102. By offloading the computation needed to generate the three-dimensional image 140 from the first device 102 to the second device 106, the battery life of the first device 102 is increased. The second device 106 can be a computationally powerful machine able to render the three-dimensional image 140 quickly and send the three-dimensional image 140 to the first device 102 for display on the first display unit 620 of FIG. 6.

The three-dimensional display system 100 describes the module functions or order as an example. The modules can be partitioned differently. For example, the edge detection module 702 and the straight line search module 704 can be combined. In another example, the vanishing line search module 708 and the vanishing point calculation module 710 can be combined. Each of the modules can operate individually and independently of the other modules.

Furthermore, data generated in one module can be used by another module without being directly coupled to each other. For example, the depth generation module 712 can receive the source image 130 from the edge detection module 702.

Figure 8:
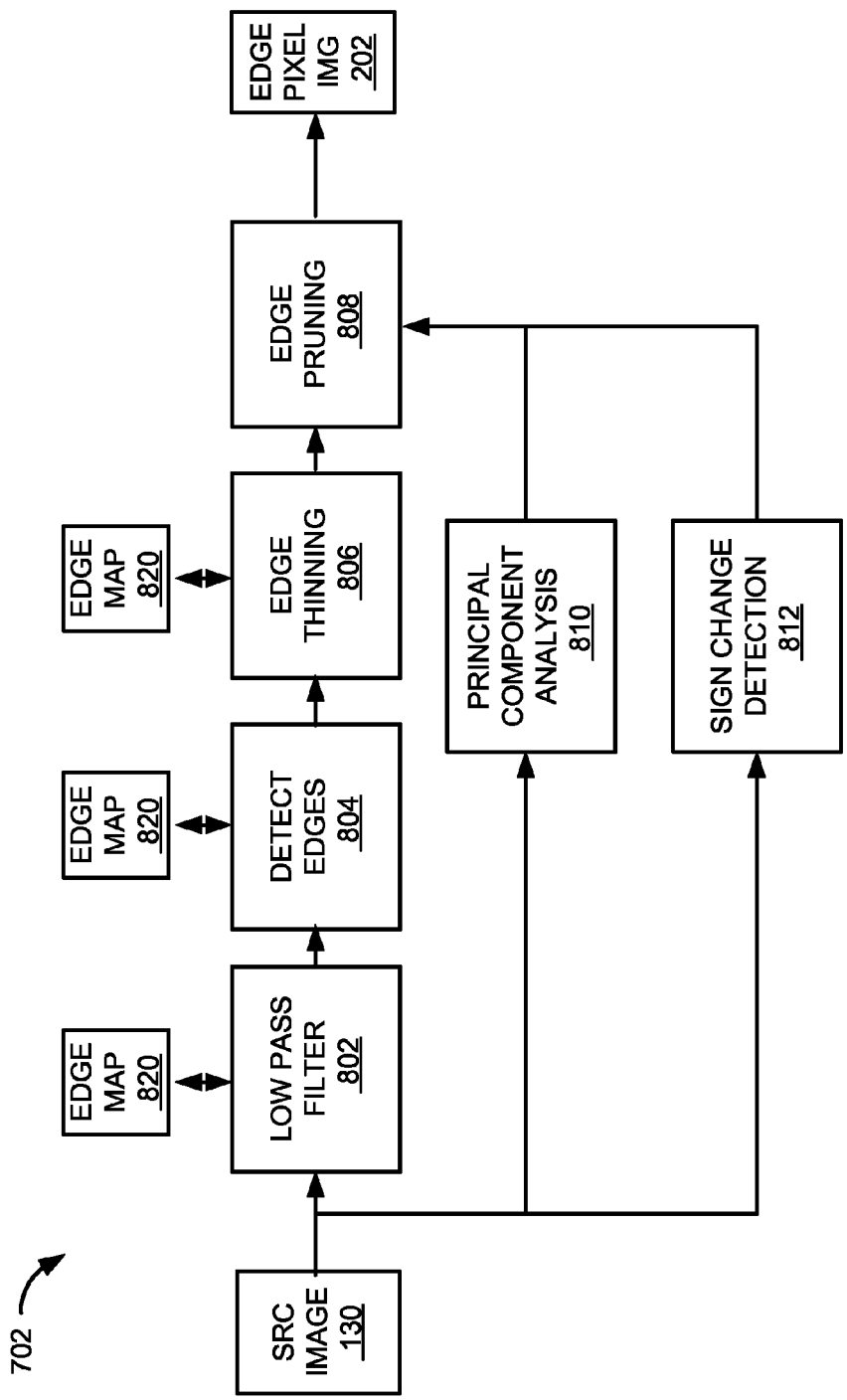
FIG. 8 is a detailed control flow of an edge detection module.

Referring now to FIG. 8, therein is shown a detailed control flow of the edge detection module 702. The edge detection module 702 can calculate the edge pixel image 202 by applying edge detection transforms to the source image 130. The edge detection module 702 can include a low pass filter module 802, a detect edges module 804, an edge thinning module 806, an edge pruning module 808, a principal component analysis module 810, and a sign change detection module 812.

The edge detection module 702 can detect the edges in the source image 130 using a variety of edge detection operations. For example, edge detection operations can be include the Sobel operator, Canny edge detection, sub-sampling, low pass filtered input processing, edge pruning, edge thinning, Sobel-Max masking, principal component analysis (PCA), sign change detection, LaPlacian zero crossing, thresholding, linking, differential edge detection, Marr-Hildreth operator, phase congruency, or a combination thereof. Edges can include sharp changes in image brightness or color that indicate the boundary between objects in the source image 130.

For robust edge detection, several edge detection operations can be performed individually and the results compared to calculate the edge pixel image 202. The edge pixel image 202 can be calculated by using comparing the line segment 216 of FIG. 2 from one edge detection operation and comparing it to the line segment 216 from another edge detection operation. If the line segment 216 is detected in more than one edge detection result, then the line segment 216 has a higher likelihood of representing an edge. For example, the edge detection module 702 can calculate the edge pixel image 202 using an edge map, principal component analysis (PCA) ratio, and sign change detection (SCD) ratio.

The edge detection module 702 can calculate an edge map 820 for evaluating edge map information by performing a low pass filter on the source image 130, detecting edges, thinning edges, and pruning the edges. The edge map 820 is defined as a representation of edge information from the source image 130.

The low pass filter module 802 is defined as a module to reduce high-frequency noise information in the source image 130. The low pass filter module 802 can reduce aliasing or jaggy edges in the source image 130 by removing high frequency noise information and reducing the range of information in the source image 130. The low pass filter module 802 creates an initial version of the edge map 820. The low pass filter module 802 can pass the control flow to the detect edges module 804.

The detect edges module 804 is defined as a module to calculate a gradient computation on the low pass filtered image of the edge map 820 created by the low pass filter module 802. The detect edges module 804 can perform an edge detection operation on the edge map 820. For example, the gradient computation can be performed using Sobel-Max masks, Canny edge detection, differential edge, or a combination thereof. The detect edges module 804 can update the edge map 820 with the results of the gradient computation. The detect edges module 804 can pass control flow to the edge thinning module 806.

The edge thinning module 806 is defined as a module to perform an intensity thresholding operation on the edge map 820 that was updated by the detect edges module 804. Edge thinning can remove spurious points on an edge by eliminating the edge pixel 302 of FIG. 3 when the intensity of the edge pixel 320 of FIG. 3 is below an intensity threshold. The edge thinning module 806 can update the edge map 820 as a post-treatment to the edge map 820 to prevent or reduce chunky edges in the edge map 820. The edge thinning module 806 can pass control flow to the edge pruning module 808.

The edge detection module 702 can include the principal component analysis module 810. The principal component analysis module 810 is defined as a module for detecting edges in the source image 130. The edge detection can be performed using a principal component analysis on the source image 130. Principal component analysis is defined as an orthogonal transformation to correlate values by identifying the greatest variance in a data set. The principal component analysis module 810 can calculate a principal component analysis ratio to provide dominant orientation information on pixels in the source image 130 with large gradients. The dominant orientation information indicates the most prevalent orientation angle. The principal component analysis module 810 can pass control flow to the edge pruning module 808.

The edge detection module 702 can include the sign change detection module 812. The sign change detection module 812 is defined as a module to detect edges in the source image 130 by detecting a sign change in a processed image that indicates an edge. The sign change detection module 812 can calculate a sign change ratio that describes local orientation change features of pixels. For example, the sign change detection module 812 can calculate the change of sign in a second derivative function of a set of pixels to determine if the sign of the second derivative has changed to indicate an edge was detected. The sign change detection module 812 can pass control flow to the edge pruning module 808.

The edge detection module 702 can include the edge pruning module 808. The edge pruning module 808 is defined as a module that can correlate the results of the edge map, the principal change analysis ratio, and the sign change ratio to calculate the edge pixel image 202. The edge pruning module 808 can correlate the results and identify the line segment 216 that are identified in more than one of the results. The edge pruning module 808 can also perform the pruning operation using a reduced data set to reduce the computational load. The reduced data set can be determined using a data reduction techniques, such as a sub-sampled full high definition (FHD) image, quantization, or other similar method.

Figure 9:
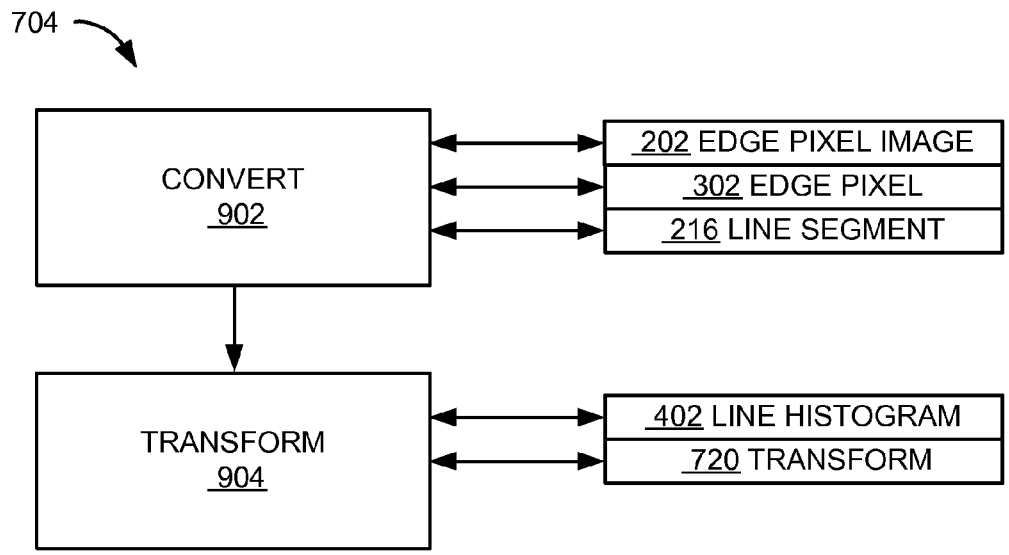
FIG. 9 is a detailed control flow of the straight line search module.

Referring now to FIG. 9, therein is shown a detailed control flow of the straight line search module 704. The straight line search module 704 can identify straight lines in the edge pixel image 202 and generate the line histogram 402. The control flow of the straight line search module 704 can include a convert module 902 and a transform module 904.

The straight line search module 704 can include the convert module 902. The convert module 902 can convert the each of the edge pixel 302 in the edge pixel image 202 into the line segment 216 represented in polar coordinates.

Each of the edge pixel 302 with Cartesian coordinates (x,y) can correspond to the line segment 216 having a polar coordinate with a distance component, rho, and an angular component, theta. In polar notation, rho is the distance from the origin of the edge pixel image 202 to the line segment 216 and theta is the angle between the positive x-axis 134 of FIG. 1 and a perpendicular line connecting the origin to the straight line segment. For each of the edge pixel 302 in the edge pixel image 202, an edge direction is calculated based on the gradient in the vertical and horizontal directions to form the line segment 216.

The straight line search module 704 can identify the straight lines in the edge pixel image 202 in the transform module 904. The transform module 904 can apply the transform 720 to the edge pixel image 202 to generate the line histogram 402.

The line histogram 402 is defined as a representation of the distribution of lines in the edge pixel image 202. The line histogram 402 can be calculated by applying the transform 720 to the polar coordinate representation of the edge pixel image 202. The transform 720 is a feature extraction technique used to identify lines in the edge pixel image 202. The transform 720 can include a Gradient-based Hough Transform, thresholding, or a combination thereof.

For example, the transform module 904 can apply a Gradient-based Hough Transform on the edge pixel image 202 to obtain the two-dimensional Hough Transform histogram. The Gradient-based Hough Transform is defined as a modified version of the Hough Transform that reduces the computational load required to calculate the Hough Transform histogram. The modified Hough transform can include modifications to reduce computational complexity.

One modification to the Hough transform is that for a given theta, the rho value for the pixel can be either positive or negative depending on the location of the pixel relative to the origin. Therefore, the size of the typical rho-theta space is 180·(2·rho$_{max}$+1), assuming 180 discrete values for theta (−90 to +90 degrees) and 2·rho$_{max}$+1 discrete values for rho.

In the modified Hough transform, pixels yielding a negative rho value are calculated such that the resulting calculated values of rho and theta are theta=theta+π and rho=|rho|. Thus, the size of the rho-theta space can become on the order of 270·(rho$_{max}$+1) with rho$_{max}$ typically on the order of several tens of units of distance. The reduced size of the rho-theta space can reduce the size of the Hough histogram and requires less memory and less computation to calculate.

Another modification of the Hough transform is used to reduce the number of rho-theta values used for each of the edge pixel 302. In the Hough transform for line detection, a complete set of the discrete theta values $$\left(\text{theta}\varepsilon\left[-\frac{\pi}{2}, \frac{\pi}{2}\right]\right)$$

will be applied to every pixel to calculate the corresponding rho values. This modification limits theta to a single value obtained by calculating the edge orientation based on the horizontal and vertical gradients and transposing the edge angle 90° to get the theta value. By limiting calculation to only one pair of rho-theta values, the computation for rho-theta values, as well as the Hough histogram, can be greatly reduced leading to sufficient processing speed for real time application. The line histogram 402 can have axes rho and theta with an accumulator value for each (rho, theta) pair. The accumulator value represents the number of line segments for a given value of rho and theta. For each of the line segment 216, the accumulator value for the corresponding rho and theta coordinate is incremented. For example, the value of the line histogram 402 can be incremented by one for each straight line segment for a particular value of rho and lambda. In another example, the accumulator value for the line segment 216 represented by the polar coordinate (rho, theta) can be incremented by one for when the line segment 216 is on or adjacent to the particular values of rho and lambda. This can be done to compensate for edges that are not well defined. After completion, the line histogram 402 can represent the distribution of all straight lines in the edge pixel image 202.

It has been discovered that the present invention provides the three-dimensional display system 100 with improved calculation of the line histogram 402 by reducing the amount of memory needed during calculation. The use of the transform 720, such as a Gradient-based Hough transform, to reduce the size of the line histogram 402 can reducing the amount of memory used in the first storage unit 614 of FIG. 6 and reduce the amount of computation effort in the first control unit 602 of FIG. 6 required to detect lines. The transform 720 can use the edge orientation of each of the edge pixel 302 to reduce the number of rho-theta values that are required to calculate the line histogram 402, reducing the amount of computational effort and simplifying detection of the straight line segments in the edge pixel image 202.

Figure 10:
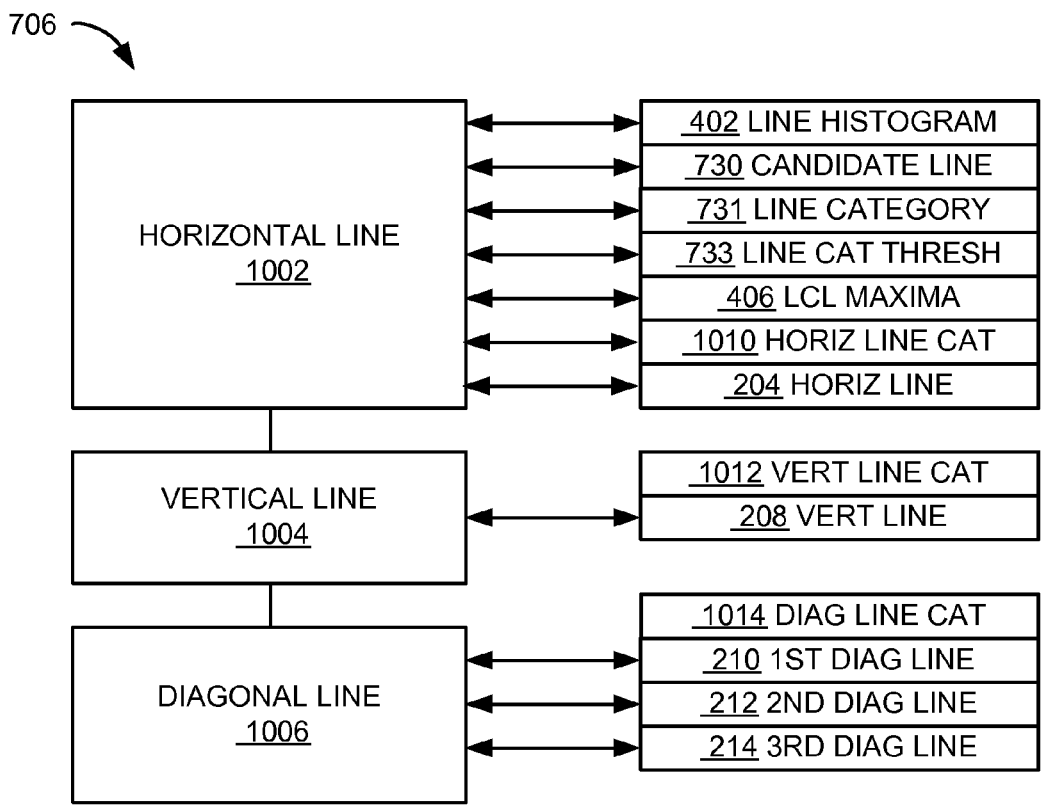
FIG. 10 is a detailed control flow of the line detection module.

Referring now to FIG. 10, therein is a detailed control flow of the line detection module 706. The line detection module 706 can detect the candidate line 730 in the edge pixel image 202 of FIG. 2 including the horizontal line 204, the vertical line 208, the first diagonal line 210, the second diagonal line 212, and the third diagonal line 214.

The line detection module 706 can calculate the candidate line 730 meeting or exceeding a pre-defined value of the line category threshold 733 for the line category 731. The values for the line category threshold 733 can be calculated before the operation of the three-dimensional display system 100. The line category threshold 733 can be stored in the first storage unit 614 of FIG. 6. The pre-defined values of the line category threshold 733 can be retrieved from the first storage unit 614.

The line category threshold 733 can include a variety of values for different line types. The line category 731 can include a horizontal line category 1010, a vertical line category 1012, a diagonal line category 1014, or a combination thereof.

The candidate line 730 can include a variety of lines. The candidate line 730 can include the horizontal line 204, the vertical line 208, the first diagonal line 210, the second diagonal line 212, and the third diagonal line 214. To prevent false line identification, a line reliability check process can be adopted to remove false or wrong line detections. The line reliability check can compare the line histogram 402 to a pre-determined value. The predetermined value can be retrieved from a memory such as the first storage unit 614 of FIG. 6, the second storage unit 644 of FIG. 6, or a combination thereof.

The line detection module 706 can detect the candidate line 730 for the horizontal line 204 in a horizontal line module 1002. The horizontal line module 1002 can calculate the candidate line 730 in the line histogram 402 by comparing values of the line histogram 402 against a pre-defined value of the line category threshold 733 for the line category 731 for horizontal lines.

For example, the horizontal line module 1002 can identify the local maxima 406 of the line histogram 402 closest to the value of theta that represents a horizontal line. This can represent the candidate line 730 that has the most line segments with a horizontal orientation.

The line detection module 706 can detect the candidate line 730 for the vertical line 208 in a vertical line module 1004. The vertical line module 1004 can calculate the candidate line 730 in the line histogram 402 by comparing values of the line histogram 402 against a pre-defined value of the line category threshold 733 for the line category 731 for vertical lines. The pre-defined values of the line category threshold 733 for the line category 731 are determined in advance and can be stored in a memory, such as the first storage unit 614, the second storage unit 644, or a combination thereof. For example, the pre-defined values of the line category threshold 733 can indicate that the local maxima 406 in the line histogram 402 in the range of rho-theta values representing a horizontal line.

In another example, the vertical line module 1004 can identify the local maxima 406 of the line histogram 402 closest to the value of theta that represents a vertical line. This can represent the candidate line 730 that has the most line segments with a vertical orientation.

The line detection module 706 can calculate the candidate line 730 for the first diagonal line 210, the second diagonal line 212, and the third diagonal line 214 in a diagonal line module 1006. The diagonal line module 1006 can detect the candidate line 730 for the diagonal lines in the line histogram 402 by comparing values of the line histogram 402 against a pre-defined value of the line category threshold 733 for the line category 731 for diagonal lines.

For example, the diagonal line module 1006 can identify one or more of the local maxima 406 of the line histogram 402 in the ranges of theta that represent non-vertical or non-horizontal lines. This can represent the candidate line 730 that has the most line segments with a non-vertical and non-horizontal orientation.

In another example, the diagonal line module 1006 can detect the first diagonal line 210, the second diagonal line 212, and the third diagonal line 214 by identifying the candidate line 730 for each of the three highest values of the local maxima 406 in the line histogram 402.

The predefined threshold value for the line category threshold 733 for the line category 731 can be determined to only detect and select dominant lines that are above a predefined threshold value. For example, the threshold value can be based on the size of the picture, the type of scene, or a combination thereof. The dominant lines can include continuous lines, broken lines composed of multiple line segments, or a combination thereof.

The predefined threshold values for the local maxima 406 can be determined based on a predefined threshold that can be based on the image, the scene, the brightness, image composition, or a combination thereof. The threshold values can be specific values or ranges of theta values based on the type of lines, such as vertical, horizontal, diagonal, or a combination thereof. Rho values are not considered in line detection.

The first control unit 602 of FIG. 6 can execute the first software 618 of FIG. 6 for the horizontal line module 1002 to detect the candidate line 730 for the horizontal line 204. The first control unit 602 can execute the first software 618 for the vertical line module 1004 to detect the candidate line 730 for the vertical line 208. The first control unit 602 can execute the first software 618 for the diagonal line module 1006 to detect the candidate line 730 for the first diagonal line 210, the second diagonal line 212, and the third diagonal line 214.

It has been discovered that the present invention provides the three-dimensional display system 100 with improved calculation of the candidate line 730 for determination of depth and perspective of the three dimensional scene represented by the source image 130 of FIG. 1. By calculating the candidate line 730 using a pre-defined value of the line category threshold 733 can simplify the detection of the horizontal line 204, the vertical line 208, the first diagonal line 210, the second diagonal line 212, and the third diagonal line 214. The pre-defined value can be retrieved from memory without the need for additional calculation, reducing the complexity of detecting the candidate line 730. The candidate line 730 is calculated by comparing the pre-defined value of the line category threshold 733 to each of the local maxima 406. This can reduce the overall processing time, enabling the line detection process to run on smaller processors in real time.

Figure 11:
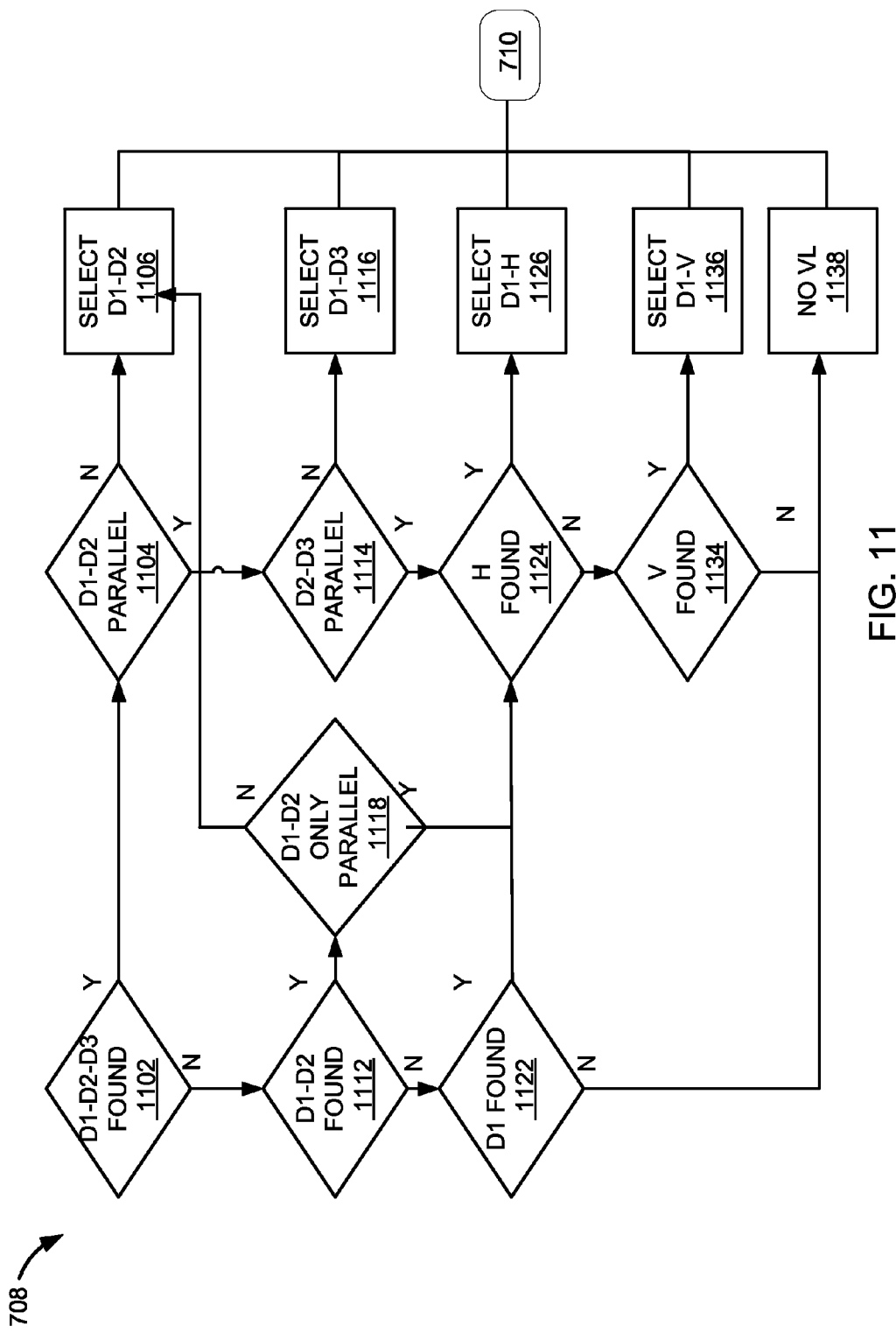
FIG. 11 is a first detailed control flow of the vanishing line search module.

Referring now to FIG. 11, therein is shown a first detailed control flow of the vanishing line search module 708 of FIG. 7. The vanishing line search module 708 can calculate the first vanishing line 504 of FIG. 5 and the second vanishing line 506 of FIG. 5 when the horizontal line 204 of FIG. 2, the vertical line 208 of FIG. 2, the first diagonal line 210 of FIG. 2, the second diagonal line 212 of FIG. 2, and the third diagonal line 214 of FIG. 2 are detected.

In the control flow of the three-dimensional display system 100 of FIG. 1 as an example, control flow can pass expressly from one module to the next module as indicated. The vanishing line search module 708 can pass the control flow to the vanishing point calculation module 710.

The vanishing line search module 708 can calculate the first vanishing line 504 and the second vanishing line 506 based on the detection of lines of particular types of the line category 731 of FIG. 7 in the source image 130 of FIG. 1 and the relationship between the lines. The first vanishing line 504 and the second vanishing line 506 can be used to calculate the vanishing point 132 of FIG. 1 of the source image 130.

For example, the first vanishing line 504 can be assigned the value of the first diagonal line 210 and the second vanishing line 506 can be assigned the value of the second diagonal line 212 in two cases. First, if all three diagonal lines are found and the first diagonal line 210 and the second diagonal line 212 are not parallel. Second, when only the first diagonal line 210 and the second diagonal line 212 are found and are not parallel.

In another example, the first vanishing line 504 can be assigned the value of the first diagonal line 210 and the second vanishing line 506 can be assigned the value of the third diagonal line 214 if three conditions are met. First, all three diagonal lines are found. Second, the first diagonal line 210 and the second diagonal line 212 are parallel. Third, the second diagonal line 212 and the third diagonal line 214 are not parallel.

In yet another example, the first vanishing line 504 can be assigned the value of the first diagonal line 210 and the second vanishing line 506 can be assigned the value of the horizontal line 204 in three cases. First, if all three diagonal lines are found and are all parallel and the horizontal line 204 is found. Second, if only the first diagonal line 210 and the second diagonal line 212 are found and are both parallel and the horizontal line 204 is found. Third, only the first diagonal line 210 is found and the horizontal line 204 is found.

In still another example, the first vanishing line 504 can be assigned the value of the first diagonal line 210 and the second vanishing line 506 can be assigned the value of the vertical line 208 in three cases. First, if all three diagonal lines are found and are all parallel, the horizontal line 204 is not found and the vertical line 208 is found. Second, only the first diagonal line 210, the second diagonal line 212, and the vertical line 208 are found, and the first diagonal line 210 and the second diagonal line 212 are parallel. Third, only the first diagonal line 210 and the vertical line 208 are found.

In a further example, the first vanishing line 504 and the second vanishing line 506 can be assigned no value if only the first diagonal line 210 if found. This represents the case where no vanishing lines can be calculated. It is understood that the calculating of the first vanishing line 504 and the second vanishing line 506 can also include cases where the first vanishing line 504 and the second vanishing line 506 cannot be calculated. Therefore, the first vanishing line 504 and the second vanishing line 506 can both have no assigned value.

The three-dimensional display system 100 can include a D1-D2-D3 found module 1102, a D1-D2 parallel module 1104, a select D1-D2 module 1106, a D2-D3 parallel 1114, and a select D1-D3 module 1116. The three-dimensional display system 100 can include a D1-D2 found module 1112, a D1-D2 only parallel module 1118, a D1 found module 1122, a H found module 1124, and a select D1-H module 1126. The three-dimensional display system 100 can also include a V found module 1134, a select D1-V module 1136, and a select no VL module 1138.

The names of the modules in the three-dimensional display system 100 can be based on the functionality of the module and the named elements processed by the module. The named elements D1, D2, D3, V1, H1 are defined as the first diagonal line 210 (D1), the second diagonal line 212 (D2), the third diagonal line 214 (D3), the vertical line 208 (V), and the horizontal line 204 (H).

The term found can indicate that the named elements were all found. The term parallel can indicate that the elements were parallel. The term only parallel can indicate that only the named elements were parallel. The term No VL can indicate that no vanishing lines were detected. The term select can indicate that the named elements were selected for the first vanishing line 504 and the second vanishing line 506.

For example, the D1-D2-D3 found module 1102 can indicate that the first diagonal line 210, the second diagonal line 212, and the third diagonal line 214 were all found. In another example, the H found module 1124 can indicate that the horizontal line 204 was found.

In the control flow of the three-dimensional display system 100 as an example, control flow can pass expressly from one module to the next module as indicated.

The D1-D2-D3 found module 1102 can determine if the first diagonal line 210, the second diagonal line 212, and the third diagonal line 214 are all detected and available. If the first diagonal line 210, the second diagonal line 212, and the third diagonal line 214 are detected, then control can pass to the D1-D2 parallel module 1104. If the three diagonal lines are not all detected, then control flow can pass to the D1-D2 found module 1112.

The D1-D2 parallel module 1104 can determine if the first diagonal line 210 and the second diagonal line 212 are parallel. If the first diagonal line 210 is not parallel with the second diagonal line 212, then the control flow can pass to the select D1-D2 module 1106. If the first diagonal line 210 is parallel with the second diagonal line 212, then control flow can pass to the D2-D3 parallel module 1114.

The select D1-D2 module 1106 can identify the first vanishing line 504 as the first diagonal line 210 and the second vanishing line 506 as the second diagonal line 212. The first vanishing line 504 can be identified by assigning the first vanishing line 504 to the value of the first diagonal line 210. The second vanishing line 506 can be identified by assigning the second vanishing line 506 to value of the second diagonal line 212.

The D1-D2 found module 1112 can determine if the first diagonal line 210 and the second diagonal line 212 are found. If the first diagonal line 210 and the second diagonal line 212 are found, then the control flow can pass to the D1-D2 only parallel module 1118. If the first diagonal line 210 and the second diagonal line 212 are not found, then the control flow can pass to the D1 found module 1122.

The D2-D3 parallel module 1114 can determine if the second diagonal line 212 and the third diagonal line 214 are parallel. If the second diagonal line 212 is not parallel with the third diagonal line 214, then the control flow can pass to the select D1-D3 module 1116. If the second diagonal line 212 is parallel with the third diagonal line 214, then the control flow can pass to the H found module 1124.

The select D1-D3 module 1116 can identify the first vanishing line 504 as the second diagonal line 212 and the second vanishing line 506 as the third diagonal line 214. The first vanishing line 504 can be identified by assigning the first vanishing line 504 to the value of the first diagonal line 210. The second vanishing line 506 can be identified by assigning the second vanishing line 506 to value of the third diagonal line 214.

The D1-D2 only parallel module 1118 can determine if the first diagonal line 210 and the second diagonal line 212 are parallel. If the first diagonal line 210 is parallel with the second diagonal line 212, then the control flow can pass to the H found module 1124. If the first diagonal line 210 is not parallel with the second diagonal line 212, then control flow can pass to the select D1-D2 module 1106.

The D1 found module 1122 can determine if the first diagonal line 210 is found. If the first diagonal line 210 is found, then the control flow can pass to the H found module 1124. If the first diagonal line 210 and the second diagonal line 212 are not found, then the control flow can pass to the select no VL module 1138.

The H found module 1124 can determine if the horizontal line 204 is available. If the horizontal line 204 is available, then the control flow can pass to the select D1-H module 1126. If the horizontal line 204 is not available, then the control flow can pass to the V found module 1134.

The select D1-H module 1126 can identify the first vanishing line 504 as the first diagonal line 210 and the second vanishing line 506 as the horizontal line 204. The first vanishing line 504 can be identified by assigning the first vanishing line 504 to the value of the first diagonal line 210. The second vanishing line 506 can be identified by assigning the second vanishing line 506 to value of the horizontal line 204.

The V found module 1134 can determine if the vertical line 208 is available. If the vertical line 208 is available, then the control flow can pass to the select D1-V module 1136. If the vertical line 208 is not available, then the control flow can pass to the select no VL module 1138.

The select D1-V module 1136 can identify the first vanishing line 504 as the first diagonal line 210 and the second vanishing line 506 as the vertical line 208. The first vanishing line 504 can be identified by assigning the first vanishing line 504 to the value of the first diagonal line 210. The second vanishing line 506 can be identified by assigning the second vanishing line 506 to value of the vertical line 208.

The select no VL module 1138 can identify the first vanishing line 504 and the second vanishing line 506 as having no value to indicate that the first vanishing line 504 and the second vanishing line 506 have not been assigned a value.

It has been discovered that the present invention provides the three-dimensional display system 100 with improved detection of depth and perspective in the three dimensional scene represented by the source image 130. Identifying the first vanishing line 504 and the second vanishing line 506 using the constrained set of lines including the horizontal line 204, the vertical line 208, the first diagonal line 210, the second diagonal line 212, and the third diagonal line 214, can reduce the amount of processing required to calculate the vanishing point 132. Limiting the potential vanishing lines to a defined set of lines instead of the set of all lines in the source image 130 reduces the amount of calculation needed to find the vanishing lines by placing an upper bound on number of lines to check. By reducing the amount of processing required, the vanishing point 132 can be calculated in less time and with a smaller processing unit.

Figure 12:
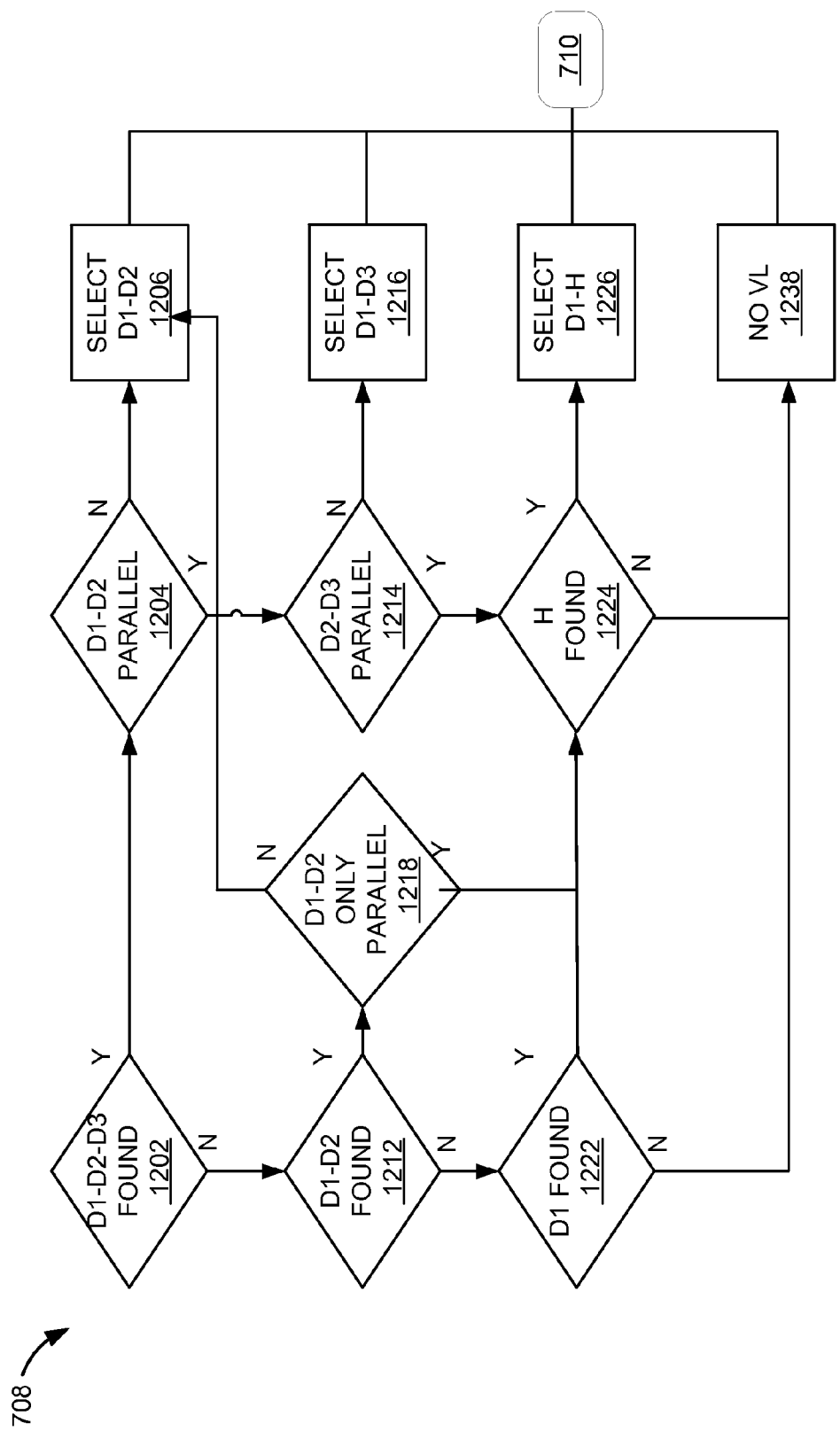
FIG. 12 is a second detailed control flow of the vanishing line search module.

Referring now to FIG. 12, therein is shown a second detailed control flow of the vanishing line search module 708. The vanishing line search module 708 can calculate the first vanishing line 504 of FIG. 5 and the second vanishing line 506 of FIG. 5 when only the horizontal line 204 of FIG. 2, the first diagonal line 210 of FIG. 2, the second diagonal line 212 of FIG. 2, and the third diagonal line 214 of FIG. 2 are detected.

In the control flow of the three-dimensional display system 100 of FIG. 1 as an example, control flow can pass expressly from one module to the next module as indicated. The vanishing line search module 708 can pass the control flow to the vanishing point calculation module 710.

The three-dimensional display system 100 can include a D1-D2-D3 found module 1202, a D1-D2 parallel module 1204, a select D1-D2 module 1206, a D2-D3 parallel 1214, and a select D1-D3 module 1216. The three-dimensional display system 100 can include a D1-D2 found module 1212, a D1-D2 only parallel module 1218, a D1 found module 1222, an H found module 1224, a select D1-H module 1226, and a select no VL module 1238.

The D1-D2-D3 found module 1202 can determine if the first diagonal line 210, the second diagonal line 212, and the third diagonal line 214 are all detected and available. If the first diagonal line 210, the second diagonal line 212, and the third diagonal line 214 are detected, then control can pass to the D1-D2 parallel module 1204. If the three diagonal lines are not all detected, then control flow can pass to the D1-D2 found module 1212.

The D1-D2 parallel module 1204 can determine if the first diagonal line 210 and the second diagonal line 212 are parallel. If the first diagonal line 210 is not parallel with the second diagonal line 212, then the control flow can pass to the select D1-D2 module 1206. If the first diagonal line 210 is parallel with the second diagonal line 212, then control flow can pass to the D2-D3 parallel module 1214.

The select D1-D2 module 1206 can identify the first vanishing line 504 as the first diagonal line 210 and the second vanishing line 506 as the second diagonal line 212. The first vanishing line 504 can be identified by assigning the first vanishing line 504 to the value of the first diagonal line 210. The second vanishing line 506 can be identified by assigning the second vanishing line 506 to value of the second diagonal line 212.

The D1-D2 found module 1212 can determine if the first diagonal line 210 and the second diagonal line 212 are found. If the first diagonal line 210 and the second diagonal line 212 are found, then the control flow can pass to the D1-D2 only parallel module 1218. If the first diagonal line 210 and the second diagonal line 212 are not found, then the control flow can pass to the D1 found module 1222.

The D2-D3 parallel module 1214 can determine if the second diagonal line 212 and the third diagonal line 214 are parallel. If the second diagonal line 212 is not parallel with the third diagonal line 214, then the control flow can pass to the select D1-D3 module 1216. If the second diagonal line 212 is parallel with the third diagonal line 214, then the control flow can pass to the H found module 1224.

The select D1-D3 module 1216 can identify the first vanishing line 504 as the second diagonal line 212 and the second vanishing line 506 as the third diagonal line 214. The first vanishing line 504 can be identified by assigning the first vanishing line 504 to the value of the first diagonal line 210. The second vanishing line 506 can be identified by assigning the second vanishing line 506 to value of the third diagonal line 214.

The D1-D2 only parallel module 1218 can determine if the first diagonal line 210 and the second diagonal line 212 are parallel. If the first diagonal line 210 is parallel with the second diagonal line 212, then the control flow can pass to the H found module 1224. If the first diagonal line 210 is not parallel with the second diagonal line 212, then control flow can pass to the select D1-D2 module 1206.

The D1 found module 1222 can determine if the first diagonal line 210 is found. If the first diagonal line 210 is found, then the control flow can pass to the H found module 1224. If the first diagonal line 210 and the second diagonal line 212 are not found, then the control flow can pass to the select no VL module 1238.

The H found module 1224 can determine if the horizontal line 204 is available. If the horizontal line 204 is available, then the control flow can pass to the select D1-H module 1226. If the horizontal line 204 is not available, then the control flow can pass to the select no VL module 1238.

The select D1-H module 1226 can identify the first vanishing line 504 as the first diagonal line 210 and the second vanishing line 506 as the horizontal line 204. The first vanishing line 504 can be identified by assigning the first vanishing line 504 to the value of the first diagonal line 210. The second vanishing line 506 can be identified by assigning the second vanishing line 506 to value of the horizontal line 204.

The select no VL module 1238 can identify the first vanishing line 504 and the second vanishing line 506 as having no value to indicate that the first vanishing line 504 and the second vanishing line 506 have not been assigned a value.

It has been discovered that the present invention provides the three-dimensional display system 100 with improved detection of depth and perspective in the three dimensional scene represented by the source image 130 of FIG. 1. Identifying the first vanishing line 504 and the second vanishing line 506 using the constrained set of lines of the horizontal line 204, the first diagonal line 210, the second diagonal line 212, and the third diagonal line 214, can reduce the amount of processing required to calculate the vanishing point 132 of FIG. 1. Limiting the potential vanishing lines to a defined set of lines instead of the set of all lines in the source image 130 reduces the amount of calculation needed to find the vanishing lines by placing an upper bound on number of lines to check. By reducing the amount of processing required, the vanishing point 132 can be calculated in less time and with a smaller processing unit.

Figure 13:
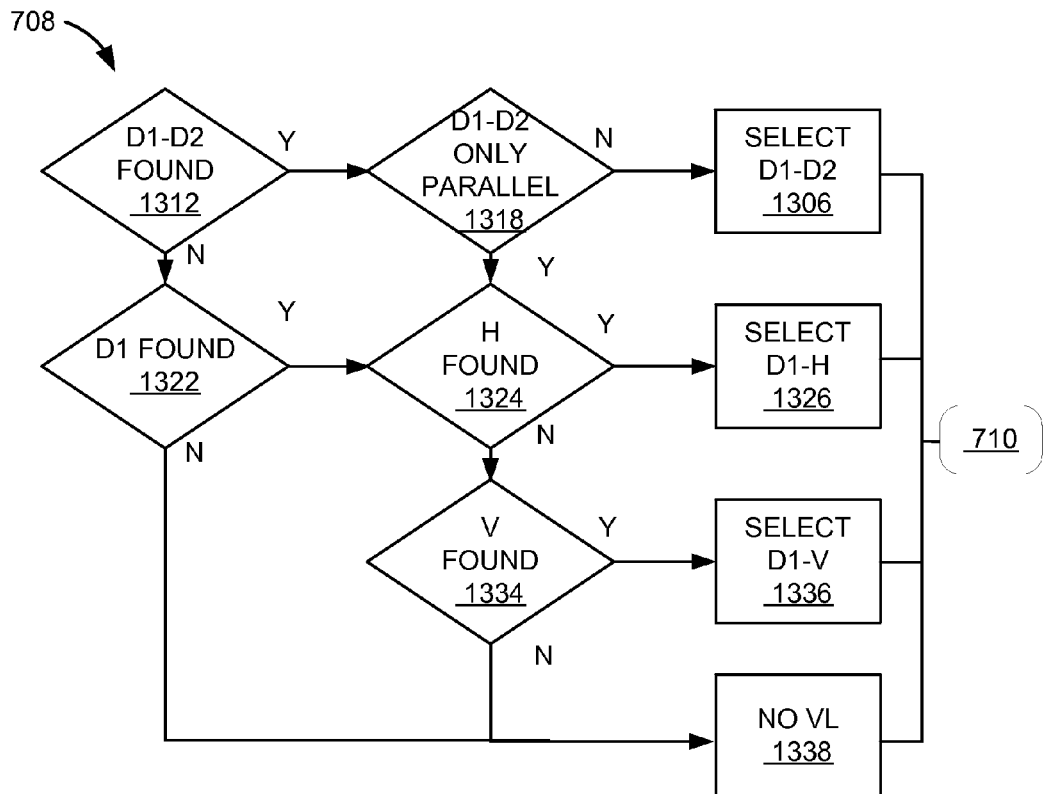
FIG. 13 is a third detailed control flow of the vanishing line search module.

Referring now to FIG. 13, therein is shown a third detailed control flow of the vanishing line search module 708. The vanishing line search module 708 can calculate the first vanishing line 504 of FIG. 5 and the second vanishing line 506 of FIG. 5 when only the horizontal line 204 of FIG. 2, the vertical line 208 of FIG. 2, the first diagonal line 210 of FIG. 2, and the second diagonal line 212 of FIG. 2 are detected.

In the control flow of the three-dimensional display system 100 of FIG. 1 as an example, control flow can pass expressly from one module to the next module as indicated. The vanishing line search module 708 can pass the control flow to the vanishing point calculation module 710.

The vanishing line search module 708 can calculate the first vanishing line 504 and the second vanishing line 506 based on the detection of lines of particular types of the line category 731 in the source image 130 and the relationship between the lines. The first vanishing line 504 and the second vanishing line 506 can be used to calculate the vanishing point 132 of FIG. 1 of the source image 130 of FIG. 1.

The three-dimensional display system 100 can include a D1-D2 found module 1312, an D1-D2 only parallel module 1318, a select D1-D2 module 1306, a D1 found module 1322, a H found module 1324, and a select D1-H module 1326. The three-dimensional display system 100 can also include a V found module 1334, a select D1-V module 1336, and a select no VL module 1338.

The select D1-D2 module 1306 can identify the first vanishing line 504 as the first diagonal line 210 and the second vanishing line 506 as the second diagonal line 212. The first vanishing line 504 can be identified by assigning the first vanishing line 504 to the value of the first diagonal line 210. The second vanishing line 506 can be identified by assigning the second vanishing line 506 to value of the second diagonal line 212.

The D1-D2 found module 1312 can determine if the first diagonal line 210 and the second diagonal line 212 are found. If the first diagonal line 210 and the second diagonal line 212 are found, then the control flow can pass to the D1-D2 only parallel module 1318. If the first diagonal line 210 and the second diagonal line 212 are not found, then the control flow can pass to the D1 found module 1322.

The D1-D2 only parallel module 1318 can determine if the first diagonal line 210 and the second diagonal line 212 are parallel. If the first diagonal line 210 is parallel with the second diagonal line 212, then the control flow can pass to the H found module 1324. If the first diagonal line 210 is not parallel with the second diagonal line 212, then control flow can pass to the select D1-D2 module 1306.

The D1 found module 1322 can determine if the first diagonal line 210 is found. If the first diagonal line 210 is found, then the control flow can pass to the H found module 1324. If the first diagonal line 210 and the second diagonal line 212 are not found, then the control flow can pass to the select no VL module 1338.

The H found module 1324 can determine if the horizontal line 204 is available. If the horizontal line 204 is available, then the control flow can pass to the select D1-H module 1326. If the horizontal line 204 is not available, then the control flow can pass to the V found module 1334.

The select D1-H module 1326 can identify the first vanishing line 504 as the first diagonal line 210 and the second vanishing line 506 as the horizontal line 204. The first vanishing line 504 can be identified by assigning the first vanishing line 504 to the value of the first diagonal line 210. The second vanishing line 506 can be identified by assigning the second vanishing line 506 to value of the horizontal line 204.

The V found module 1334 can determine if the vertical line 208 is available. If the vertical line 208 is available, then the control flow can pass to the select D1-V module 1336. If the vertical line 208 is not available, then the control flow can pass to the select no VL module 1338.

The select D1-V module 1336 can identify the first vanishing line 504 as the first diagonal line 210 and the second vanishing line 506 as the vertical line 208. The first vanishing line 504 can be identified by assigning the first vanishing line 504 to the value of the first diagonal line 210. The second vanishing line 506 can be identified by assigning the second vanishing line 506 to value of the vertical line 208.

The select no VL module 1338 can identify the first vanishing line 504 and the second vanishing line 506 as having no value to indicate that the first vanishing line 504 and the second vanishing line 506 have not been assigned a value.

It has been discovered that the present invention provides the three-dimensional display system 100 with improved detection of depth and perspective in the three dimensional scene represented by the source image 130 of FIG. 1. Identifying the first vanishing line 504 and the second vanishing line 506 using the constrained set of lines of the horizontal line 204, the vertical line 208, the first diagonal line 210, and the second diagonal line 212 can reduce the amount of processing required to calculate the vanishing point 132 of FIG. 1. Limiting the potential vanishing lines to a defined set of lines instead of the set of all lines in the source image 130 reduces the amount of calculation needed to find the vanishing lines by placing an upper bound on number of lines to check. By reducing the amount of processing required, the vanishing point 132 can be calculated in less time and with a smaller processing unit.

Figure 14:
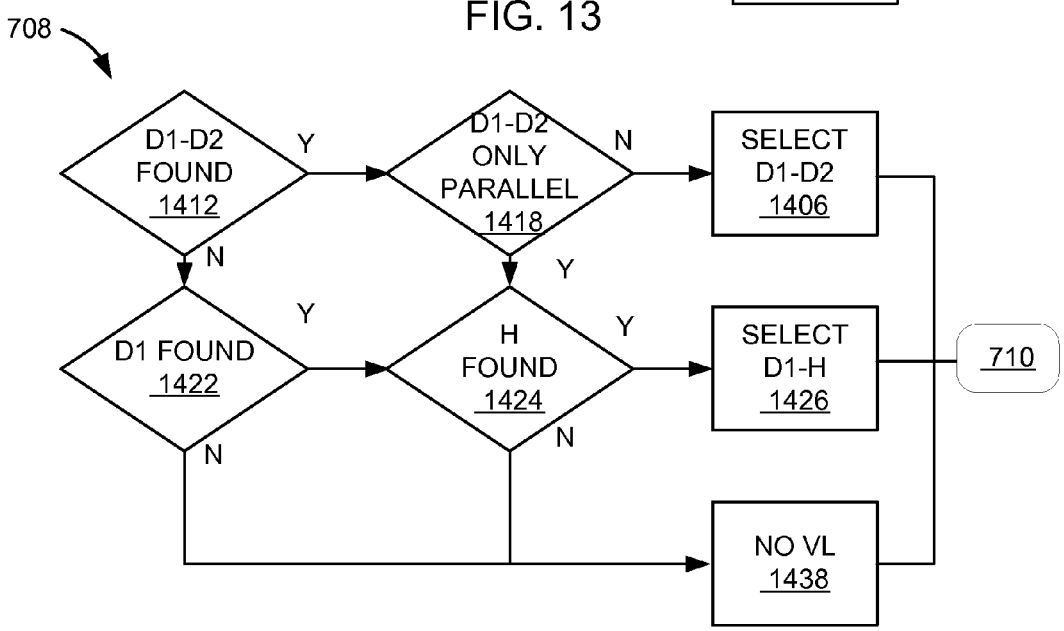
FIG. 14 is a fourth detailed control flow of the vanishing line search module.

Referring now to FIG. 14, therein is shown a fourth detailed control flow of the vanishing line search module 708. The vanishing line search module 708 can calculate the first vanishing line 504 of FIG. 5 and the second vanishing line 506 of FIG. 5 when only the horizontal line 204 of FIG. 2, the first diagonal line 210 of FIG. 2, and the second diagonal line 212 of FIG. 2 are detected.

In the control flow of the three-dimensional display system 100 of FIG. 1 as an example, control flow can pass expressly from one module to the next module as indicated. The vanishing line search module 708 can pass the control flow to the vanishing point calculation module 710.

The three-dimensional display system 100 can include a D1-D2 found module 1412, a D1-D2 only parallel module 1418, and a select D1-D2 module 1406. The three-dimensional display system 100 can include a D1 found module 1422, an H found module 1424, a select D1-H module 1426, and a select no VL module 1438.

The select D1-D2 module 1406 can identify the first vanishing line 504 as the first diagonal line 210 and the second vanishing line 506 as the second diagonal line 212. The first vanishing line 504 can be identified by assigning the first vanishing line 504 to the value of the first diagonal line 210. The second vanishing line 506 can be identified by assigning the second vanishing line 506 to value of the second diagonal line 212.

The D1-D2 found module 1412 can determine if the first diagonal line 210 and the second diagonal line 212 are found. If the first diagonal line 210 and the second diagonal line 212 are found, then the control flow can pass to the D1-D2 only parallel module 1418. If the first diagonal line 210 and the second diagonal line 212 are not found, then the control flow can pass to the D1 found module 1422.

The D1-D2 only parallel module 1418 can determine if the first diagonal line 210 and the second diagonal line 212 are parallel. If the first diagonal line 210 is parallel with the second diagonal line 212, then the control flow can pass to the H found module 1424. If the first diagonal line 210 is not parallel with the second diagonal line 212, then control flow can pass to the select D1-D2 module 1406.

The D1 found module 1422 can determine if the first diagonal line 210 is found. If the first diagonal line 210 is found, then the control flow can pass to the H found module 1424. If the first diagonal line 210 and the second diagonal line 212 are not found, then the control flow can pass to the select no VL module 1438.

The H found module 1424 can determine if the horizontal line 204 is available. If the horizontal line 204 is available, then the control flow can pass to the select D1-H module 1426. If the horizontal line 204 is not available, then control flow can pass to the select no VL module 1438.

The select D1-H module 1426 can identify the first vanishing line 504 as the first diagonal line 210 and the second vanishing line 506 as the horizontal line 204. The first vanishing line 504 can be identified by assigning the first vanishing line 504 to the value of the first diagonal line 210. The second vanishing line 506 can be identified by assigning the second vanishing line 506 to value of the horizontal line 204.

The select no VL module 1438 can identify the first vanishing line 504 and the second vanishing line 506 as having no value to indicate that the first vanishing line 504 and the second vanishing line 506 have not been assigned a value.

It has been discovered that the present invention provides the three-dimensional display system 100 with improved detection of depth and perspective in the three dimensional scene represented by the source image 130 of FIG. 1. Identifying the first vanishing line 504 and the second vanishing line 506 using the constrained set of lines of the horizontal line 204, the first diagonal line 210, and the second diagonal line 212 can reduce the amount of processing required to calculate the vanishing point 132 of FIG. 1. Limiting the potential vanishing lines to a defined set of lines instead of the set of all lines in the source image 130 reduces the amount of calculation needed to find the vanishing lines by placing an upper bound on number of lines to check. By reducing the amount of processing required, the vanishing point 132 can be calculated in less time and with a smaller processing unit.

Figure 15:
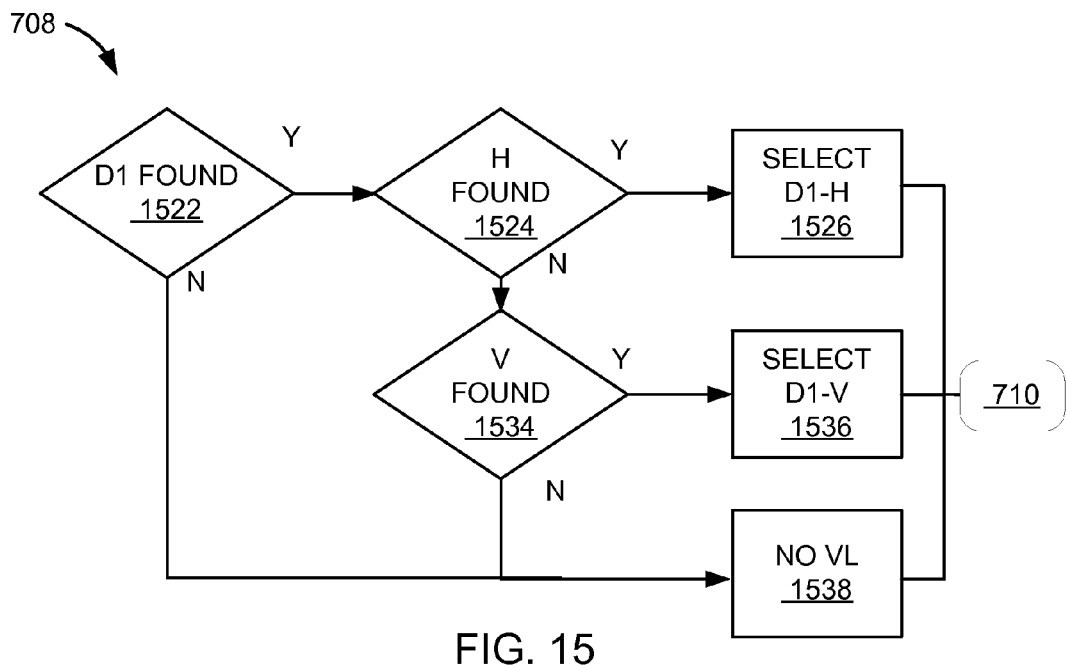
FIG. 15 is a fifth detailed control flow of the vanishing line search module.

Referring now to FIG. 15, therein is shown a fifth detailed control flow of the vanishing line search module 708. The vanishing line search module 708 can calculate the first vanishing line 504 of FIG. 5 and the second vanishing line 506 of FIG. 5 when only the horizontal line 204 of FIG. 2, the vertical line 208 of FIG. 2, and the first diagonal line 210 of FIG. 2 are detected. In the control flow of the three-dimensional display system 100 of FIG. 1 as an example, control flow can pass expressly from one module to the next module as indicated. The vanishing line search module 708 can pass the control flow to the vanishing point calculation module 710.

The vanishing line search module 708 can calculate the first vanishing line 504 and the second vanishing line 506 based on the detection of lines of particular types of the line category 731 in the source image 130 of FIG. 1 and the relationship between the lines. The first vanishing line 504 and the second vanishing line 506 can be used to calculate the vanishing point 132 of FIG. 1 of the source image 130.

The three-dimensional display system 100 can include a D1 found module 1522, an H found module 1524, and a select D1-H module 1526. The three-dimensional display system 100 can also include a V found module 1534, a select D1-V module 1536, and a select no VL module 1538.

The D1 found module 1522 can determine if the first diagonal line 210 is found. If the first diagonal line 210 is found, then the control flow can pass to the H found module 1524. If the first diagonal line 210 and the second diagonal line 212 are not found, then the control flow can pass to the select no VL module 1538.

The H found module 1524 can determine if the horizontal line 204 is available. If the horizontal line 204 is available, then the control flow can pass to the select D1-H module 1526. If the horizontal line 204 is not available, then the control flow can pass to the V found module 1534.

The select D1-H module 1526 can identify the first vanishing line 504 as the first diagonal line 210 and the second vanishing line 506 as the horizontal line 204. The first vanishing line 504 can be identified by assigning the first vanishing line 504 to the value of the first diagonal line 210. The second vanishing line 506 can be identified by assigning the second vanishing line 506 to value of the horizontal line 204.

The V found module 1534 can determine if the vertical line 208 is available. If the vertical line 208 is available, then the control flow can pass to the select D1-V module 1536. If the vertical line 208 is not available, then the control flow can pass to the select no VL module 1538.

The select D1-V module 1536 can identify the first vanishing line 504 as the first diagonal line 210 and the second vanishing line 506 as the vertical line 208. The first vanishing line 504 can be identified by assigning the first vanishing line 504 to the value of the first diagonal line 210. The second vanishing line 506 can be identified by assigning the second vanishing line 506 to value of the vertical line 208.

The select no VL module 1538 can identify the first vanishing line 504 and the second vanishing line 506 as having no value to indicate that the first vanishing line 504 and the second vanishing line 506 have not been assigned a value.

It has been discovered that the present invention provides the three-dimensional display system 100 with improved detection of depth and perspective in the three dimensional scene represented by the source image 130 of FIG. 1. Identifying the first vanishing line 504 and the second vanishing line 506 using the constrained set of lines of the horizontal line 204, the vertical line 208, and the first diagonal line 210 can reduce the amount of processing required to calculate the vanishing point 132 of FIG. 1. Limiting the potential vanishing lines to a defined set of lines instead of the set of all lines in the source image 130 reduces the amount of calculation needed to find the vanishing lines by placing an upper bound on number of lines to check. By reducing the amount of processing required, the vanishing point 132 can be calculated in less time and with a smaller processing unit.

Figure 16:
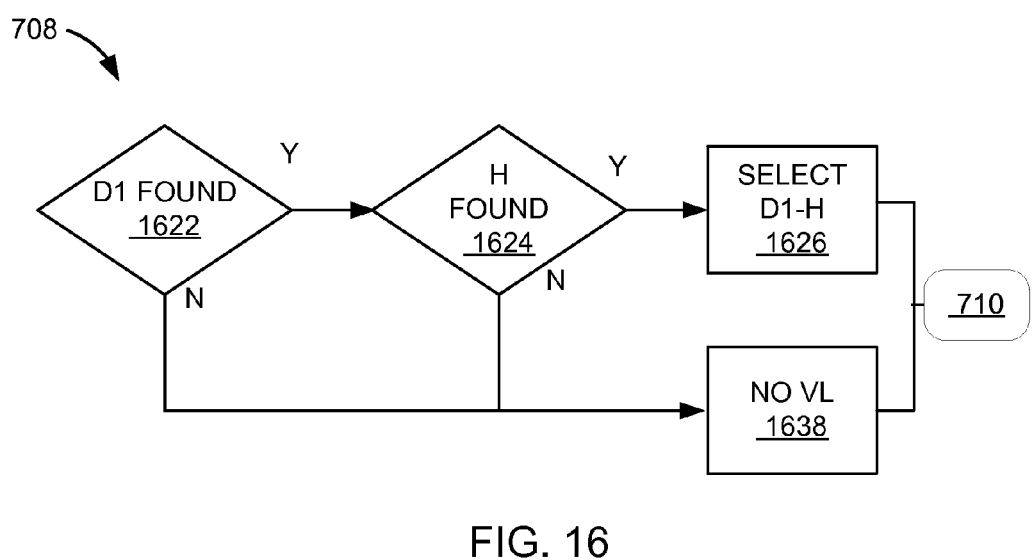
FIG. 16 is a sixth detailed control flow of the vanishing line search module.

Referring now to FIG. 16, therein is shown a sixth detailed control flow of the vanishing line search module 708. The vanishing line search module 708 can calculate the first vanishing line 504 of FIG. 5 and the second vanishing line 506 of FIG. 5 when only the horizontal line 204 of FIG. 2 and the first diagonal line 210 of FIG. 2 are detected.

In the control flow of the three-dimensional display system 100 of FIG. 1 as an example, control flow can pass expressly from one module to the next module as indicated. The vanishing line search module 708 can pass the control flow to the vanishing point calculation module 710.

The three-dimensional display system 100 can include a D1 found module 1622, an H found module 1624, a select D1-H module 1626, and a select no VL module 1638. The first vanishing line 504 and the second vanishing line 506 can be used to calculate the vanishing point 132 of FIG. 1 of the source image 130 of FIG. 1. The D1 found module 1622 can determine if the first diagonal line 210 is found. If the first diagonal line 210 is found, then the control flow can pass to the H found module 1624. If the first diagonal line 210 and the second diagonal line 212 are not found, then the control flow can pass to the select no VL module 1638.

The H found module 1624 can determine if the horizontal line 204 is available. If the horizontal line 204 is available, then the control flow can pass to the select D1-H module 1626. If the horizontal line 204 is not available, then the control flow can pass to the select no VL module 1638.

The select D1-H module 1626 can identify the first vanishing line 504 as the first diagonal line 210 and the second vanishing line 506 as the horizontal line 204. The first vanishing line 504 can be identified by assigning the first vanishing line 504 to the value of the first diagonal line 210. The second vanishing line 506 can be identified by assigning the second vanishing line 506 to value of the horizontal line 204.

The select no VL module 1638 can identify the first vanishing line 504 and the second vanishing line 506 as having no value to indicate that the first vanishing line 504 and the second vanishing line 506 have not been assigned a value.

It has been discovered that the present invention provides the three-dimensional display system 100 with improved detection of depth and perspective in the three dimensional scene represented by the source image 130. Identifying the first vanishing line 504 and the second vanishing line 506 using the constrained set of lines of the horizontal line 204 and the first diagonal line 210 can reduce the amount of processing required to calculate the vanishing point 132. Limiting the potential vanishing lines to a defined set of lines instead of the set of all lines in the source image 130 of FIG. 1 reduces the amount of calculation needed to find the vanishing lines by placing an upper bound on number of lines to check. By reducing the amount of processing required, the vanishing point 132 of FIG. 1 can be calculated in less time and with a smaller processing unit.

Figure 17:
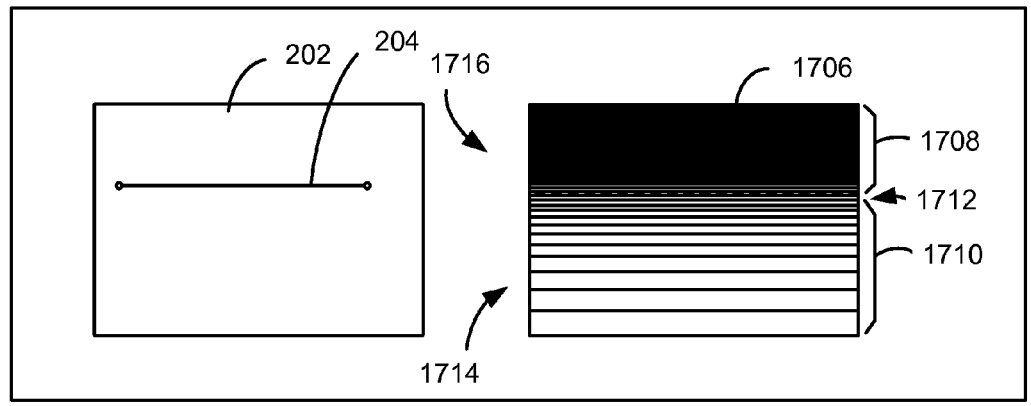
FIG. 17 is an example of a horizontal gradient map.

Referring now to FIG. 17, therein is shown an example of a horizontal gradient map 1706. The horizontal gradient map 1706 can represent the distribution of depth for pixels in the source image 130 of FIG. 1 when the horizontal line 204 is detected in the edge pixel image 202. The horizontal gradient map 1706 can be combined with other gradient distributions to generate the image gradient map 772 of FIG. 7 for the source image 130.

The horizontal gradient map is defined as a rectangular array of elements with the same dimensions as the source image 130 where each array element (x, y) indicates the relative depth of the corresponding pixel in the source image 130 relative the adjacent pixels. The horizontal gradient map 1706 is an assignment of depth for locations in the source image 130. Each location in the horizontal gradient map 1706 can correspond to the relative depth of a pixel in the source image 130.

The horizontal gradient map 1706 is partitioned into an upper region 1708 and a lower region 1710 and separated by a horizontal vanishing line 1712. For example, the horizontal vanishing line 1712 can represent a horizon in an image showing a natural outdoor scene such as a landscape or ocean view.

An upper depth distribution 1716 of the upper region 1708 can vary linearly along the vertical axis of the horizontal gradient map 1706. For example, the vertical axis can be represented by the direction perpendicular to the horizontal vanishing line 1712.

A lower depth distribution 1714 of the lower region 1710 can vary linearly along the vertical axis of the horizontal gradient map 1706. The lower depth distribution 1714 and the upper depth distribution 1716 can vary and have different slopes. For example, the lower depth distribution 1714 and the upper depth distribution 1716 can form a depth profile that can match the human sensing of depth and distance in a scene.

In another example, the values of the horizontal gradient map 1706 can be represented by a grey-scale image where pixels with the farthest depth are represented by the lowest grayscale value (i.e. zero or dark) and pixels with the shortest and closest depth can be represented by the highest grayscale value (i.e. 255 or bright). Thus, a low grayscale value is dark and can indicate a further depth, while a high grayscale value is bright and can indicate a closer depth.

The depth assignment can be represented by a formula:

$$Gmap(x, y) = \begin{cases} a_1 \cdot y + b_1 & \text{if } y \leq H \\ a_2 \cdot y + b_2 & \text{if } y > H \end{cases} \quad (3)$$

Where Gmap (x, y) is the depth of the pixel at coordinate (x, y) and $a_1$ and $a_2$ are constants representing the slope of the depth gradient and $b_1$, $b_2$ are constants representing the intersection of the slope line with the y-axis.

Figure 18:
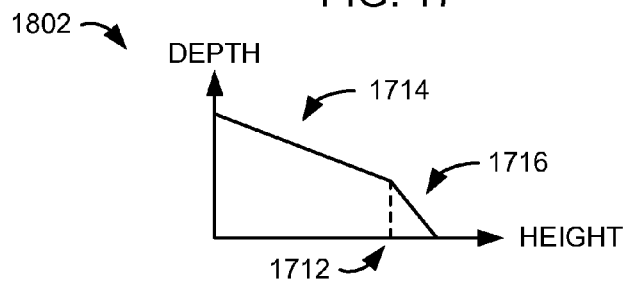
FIG. 18 is an example of a horizontal gradient chart.

Referring now to FIG. 18, therein is shown an example of a horizontal gradient chart 1802. The gradient chart 1802 can represent the distribution of depth for pixels in the source image 130 of FIG. 1.

The gradient chart 1802 is defined as a rectangular array of elements with the same dimensions as the source image 130 where each array element (x, y) indicates the relative depth of the corresponding pixel in the source image 130 relative the adjacent pixels. The gradient chart 1802 shows the upper depth distribution 1716 and the lower depth distribution 1714 for the horizontal gradient map 1706 of FIG. 17 with the horizontal vanishing line 1712. For example, the gradient chart 1802 can show there is a different slope to the gradient for the upper depth distribution 1716 and the lower depth distribution 1714.

Figure 19:
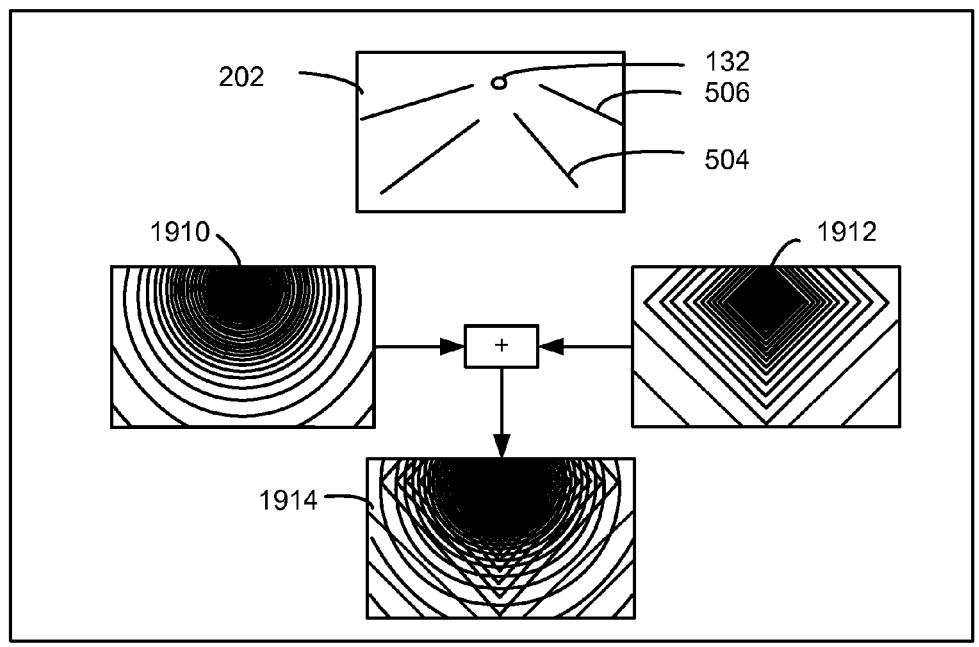
FIG. 19 is an example of a combination gradient map.

Referring now to FIG. 19, therein is shown an example of a combination gradient map 1914. The combination gradient map 1914 can represent the distribution of depth for pixels in the source image 130 of FIG. 1. The combination gradient map 1914 can be combined with other gradient distributions to generate the image gradient map 772 of FIG. 7 for the source image 130.

The combination gradient map 1914 is defined as a rectangular array of elements with the same dimensions as the source image 130 where each array element (x, y) indicates the relative depth of the corresponding pixel in the source image 130 relative the adjacent pixels. The combination gradient map 1914 can be used to assign depth for locations in the source image 130.

The combination gradient map 1914 can be generated when the source image 130 includes the vanishing point 132 close to the upper edge of the source image 130 and when the first vanishing line 504 and the second vanishing line 506 represent diagonal lines. The vanishing point 132 close to the upper edge of the source image 130 can be in an upper region of the source image 130. For example, the edge pixel image 202 can include the first vanishing line 504, the second vanishing line 506, and the vanishing point 132.

For example, the combination gradient map 1914 can represent a typical perspective view of a scene with objects. Such scenes can include buildings, streets, persons, or a combination thereof, that span toward the vanishing point 132. The vanishing point 132 can represent the farthest depth in the scene in the source image 130.

The combination gradient map 1914 can include a combination of the first gradient map 774 of FIG. 7 and the second gradient map 776 of FIG. 7. The first gradient map 774 can represent the gradient distribution 778 of FIG. 7 based on the vanishing point 132. The second gradient map 776 can represent the gradient distribution 778 based on the first vanishing line 504 and the second vanishing line 506.

For example, the first gradient map 774 can include a circular gradient map 1910 with a furthest depth at the vanishing point 132 where the depth gradient is isotropic and circularly symmetric around the vanishing point 132. The first gradient map 774 can be represented by a formula:

$$Gmap\_cir(x, y) = a \cdot \sqrt{(x-x_{vp})^2 + (y-y_{vp})^2} + b \quad (4)$$

Where $x_{vp}$ and $y_{vp}$ represent the coordinates of the vanishing point 132 and a and b are constants.

The second gradient map 776 can also include a rhombus-shaped gradient map 1912 with a furthest depth at the vanishing point 132 and the gradient distribution 778 is shaped like a pyramid with the vanishing point 132 at the peak of the pyramid. The further depths of the second gradient map 776 can be represented by lower grayscale values representing larger depths. The rhombus-shaped gradient map 1912 is based on the vanishing point 132 and predefined values to determine the shape of the rhombus. The gradient distribution 778 of the second gradient map 776 has a 90°-symmetry. The further depths representing the lower grayscale values form a rhombus pattern.

The second gradient map 776 can be represented by the equation:

$$Gmap\_rho(x, y) = \frac{(x - x_{vp}) + (y - y_{vp})}{2} \quad (5)$$

The combination gradient map 1914 can be formed by combining the first gradient map 774 and the second gradient map 776. Forming the combined gradient map can include adding the gradients, scaling the gradients, or any combination thereof. The combination gradient map 1914 can be represented by the equation:

$$Gmap(x, y) = c_1 * Gmap\_cir(x, y) + c_2 * Gmap\_rho(x, y) \quad (6)$$

The combination gradient map 1914 is calculated by combing the first gradient map 774 and the second gradient map 776. The first gradient map 774 and the second gradient map 776 can be combined by adding the gradient at each corresponding point in the first gradient map 774 and the second gradient map 776.

Figure 20:
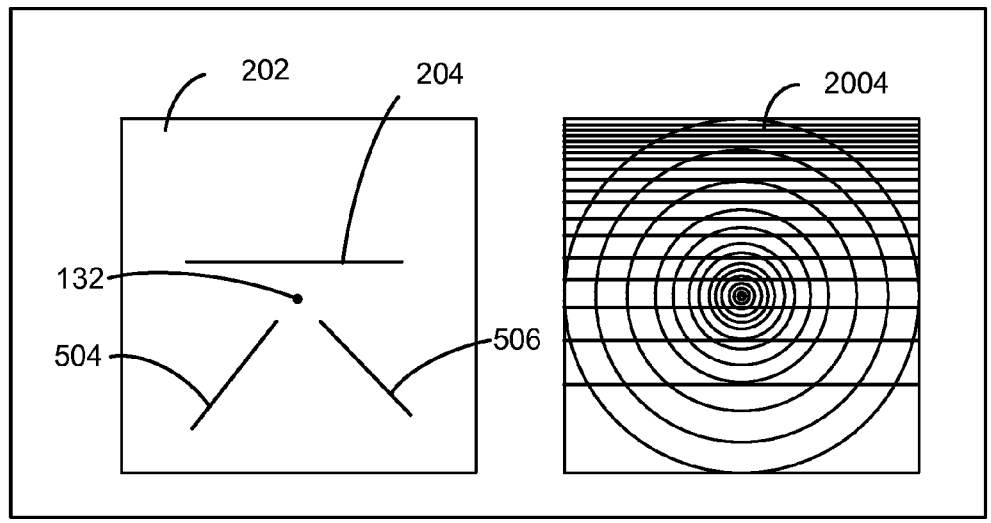
FIG. 20 is a first example of a hybrid gradient map.

Referring now to FIG. 20, therein is shown a first example of a hybrid gradient map 2004. The hybrid gradient map 2004 can represent the distribution of depth for pixels in the source image 130 of FIG. 1 where the vanishing point 132 is below the horizontal line 204. The hybrid gradient map 2004 can be combined with other gradient distributions to generate the image gradient map 772 of FIG. 7 for the source image 130.

The hybrid gradient map 2004 is defined as a rectangular array of elements with the same dimensions as the source image 130 where each array element (x, y) indicates the relative depth of the corresponding pixel in the source image 130 relative the adjacent pixels. The hybrid gradient map 2004 is an assignment of depth for locations in the source image 130. Each location in the hybrid gradient map 2004 can correspond to the relative depth of a pixel in the source image 130.

The hybrid gradient map 2004 can be generated when the edge pixel image 202 includes the vanishing point 132 and the horizontal line 204 of the edge pixel image 202. The vanishing point 132 is close to the upper edge of the source image 130 and can be in an upper region of the source image 130. The vanishing point 132 is at the intersection of the first vanishing line 504 and the second vanishing line 506.

For example, the hybrid gradient map 2004 can represent a typical perspective view of a scene that includes the vanishing point 132 and a horizon as represented by the vanishing point 132 and the first vanishing line 504 where the first vanishing line 504 represents the horizontal line 204. The vanishing point 132 can represent the farthest depth in the scene in the source image 130.

The hybrid gradient map 2004 can include a combination of the first gradient map 774 of FIG. 7 and the second gradient map 776 of FIG. 7. The first gradient map 774 can represent the horizontal gradient map 1706 of FIG. 17. The second gradient map 776 can represent the combination gradient map 1914 of FIG. 19.

The hybrid gradient map 2004 can be formed by combining the first gradient map 774 and the second gradient map 776. Forming the hybrid gradient map 2004 can include adding the gradients, scaling the gradients, or any combination thereof. The depth assignment of the hybrid gradient map 2004 can be represented by the formula:

$$Gmap(x, y) = d\_vp(y) * Gmap\_vp(x, y) + d\_h(y) * Gmap\_h(x, y) \quad (7)$$

Where Gmap_vp(x, y) is the depth gradient for the one vanishing point case, while Gmap_h(x, y) is the depth gradient for the horizontal line only case. The coefficients d_vp(y) and d_h(y) are y-coordinate dependent.

The hybrid gradient map 2004 is calculated by combing the first gradient map 774 and the second gradient map 776. The first gradient map 774 and the second gradient map 776 can be combined by adding the gradient at each corresponding point in the first gradient map 774 and the second gradient map 776.

The combination gradient map 1914 can be based on a single vanishing point Gmap_vp and can be based on a circular shape, rhombus shape, or a combination thereof. The combination gradient map 1914 can be a combination of the horizontal gradient map 1706 and the gradient map based on the single vanishing point Gmap_vp.

Figure 21:
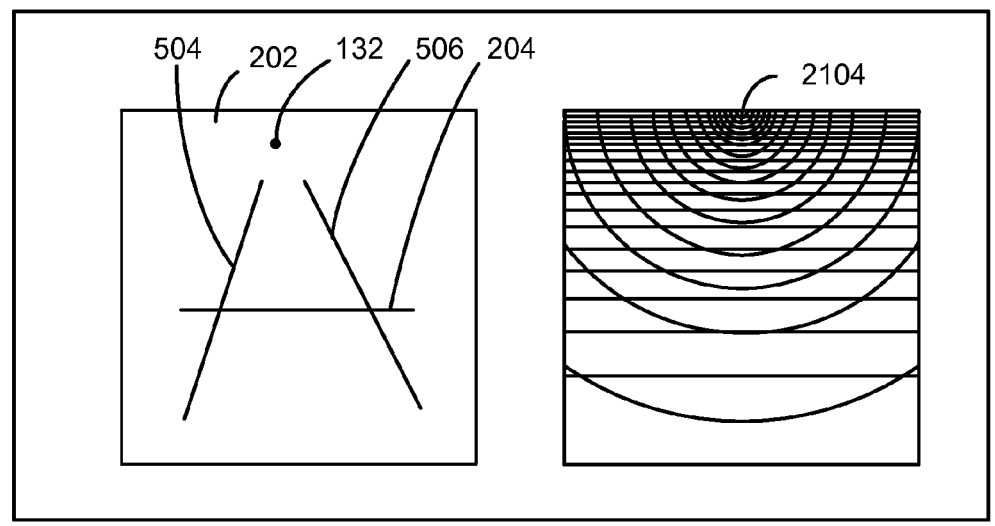
FIG. 21 is a second example of a hybrid gradient map.

Referring now to FIG. 21, therein is shown a second example of a hybrid gradient map 2104. The hybrid gradient map 2104 can represent the distribution of depth for pixels in the source image 130 of FIG. 1 when the vanishing point 132 is above the horizontal line 204 in the edge pixel image 202. The hybrid gradient map 2104 can be combined with other gradient distributions to generate the image gradient map 772 of FIG. 7 for the source image 130. The vanishing point 132 is at the intersection of the first vanishing line 504 and the second vanishing line 506.

Figure 22:
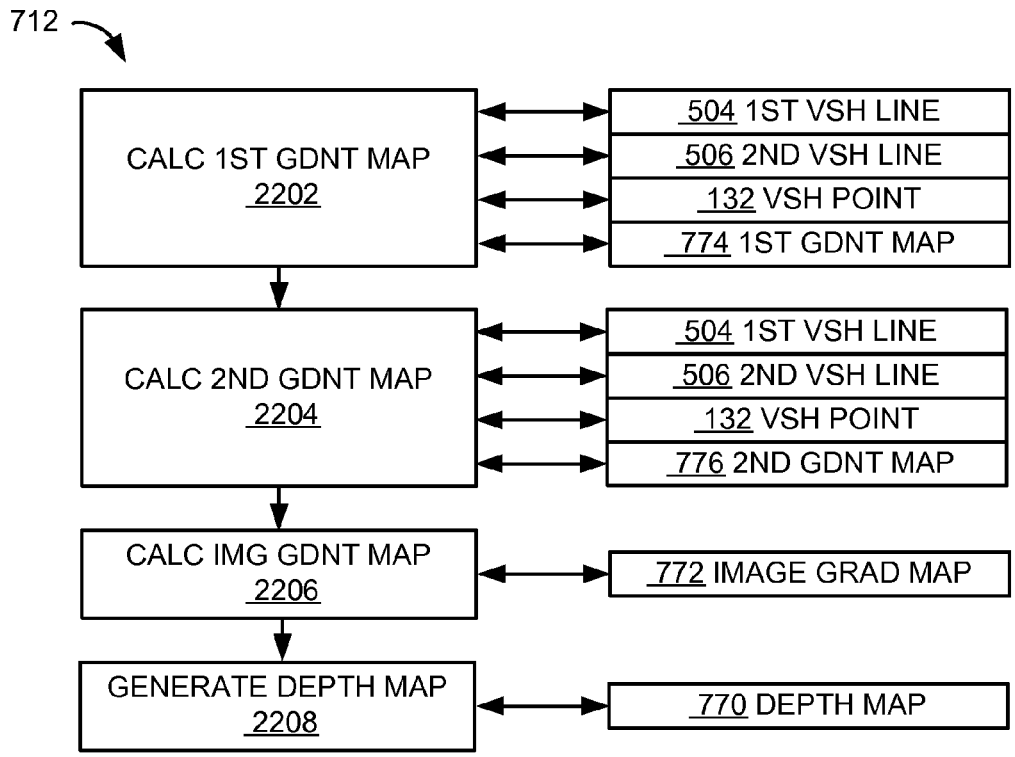
FIG. 22 is a detailed control flow of the depth generation module.

Referring now to FIG. 22, therein is shown a detailed control flow of the depth generation module 712. The depth generation module 712 can generate the depth map 770 for the source image 130 of FIG. 1 by calculating the image gradient map 772. The depth generation module 712 can include a calculate first gradient map module 2202, a calculate second gradient map module 2204, a calculate image gradient map module 2206, and a generate depth map module 2208.

The calculate first gradient map module 2202 can calculate the first gradient map 774 of the source image 130 based on the properties of the source image 130 including the presence of the vanishing point 132, the first vanishing line 504, and the second vanishing line 506. The first vanishing line 504 and the second vanishing line 506 can include the horizontal line 204 of FIG. 2, the vertical line 208 of FIG. 2, the first diagonal line 210 of FIG. 2, the second diagonal line 212 of FIG. 2, the third diagonal line 214 of FIG. 2, or a combination thereof.

The first gradient map 774 can include the horizontal gradient map 1706 of FIG. 17, the circular gradient map 1910 of FIG. 19, the rhombus-shaped gradient map 1912 of FIG. 19, the combination gradient map 1914 of FIG. 19, or a combination thereof. The calculation of the first gradient map 774 is based on a pre-define mapping of the vanishing point 132 and the line category 731 of FIG. 7 of the first vanishing line 504 and the second vanishing line 506.

For example, if only the first vanishing line 504 is available and the first vanishing line 504 is assigned to the horizontal line 204, then the first gradient map 774 can be calculated as the horizontal gradient map 1706. The horizontal gradient map 1706 can have a different gradient in the upper region 1708 of FIG. 17 than in the lower region 1710 of FIG. 17.

In another example, if the vanishing point 132 is located in the upper portion of the source image 130 and the first vanishing line 504 and the second vanishing line 506 are defined, then the first gradient map 774 can be calculated as the circular gradient map 1910. The circular gradient map 1910 can be calculated based on a depth gradient that is isotropic and circularly symmetric around the vanishing point 132.

In yet another example, if the vanishing point is located in the upper portion of the source image 130 and the first vanishing line 504 and the second vanishing line 506 are defined, then the first gradient map 774 can be calculated as the combination gradient map 1914. The combination gradient map 1914 can be calculated by combining the circular gradient map 1910 and the rhombus-shaped gradient map 1912.

The calculate second gradient map module 2204 can calculate the second gradient map of the source image 130 based on the properties of the source image 130 including the presence of the vanishing point 132, the first vanishing line 504, and the second vanishing line 506. The first vanishing line 504 and the second vanishing line 506 can include the horizontal line 204, the vertical line 208, the first diagonal line 210, the second diagonal line 212, the third diagonal line 214, or a combination thereof.

The second gradient map 776 can include the rhombus-shaped gradient map 1912, the combination gradient map 1914, or a combination thereof. The calculation of the second gradient map 776 is based on a pre-define mapping of the vanishing point 132 and the line category 731 of the first vanishing line 504 and the second vanishing line 506.

For example, if the vanishing point 132 is located in the upper portion of the source image 130 and the first vanishing line 504 and the second vanishing line 506 are defined, then the second gradient map 776 can be calculated as the rhombus-shaped gradient map 1912. The rhombus-shaped gradient map 1912 can be calculated based on a rhombus-shaped depth gradient that is centered around the vanishing point 132 and representing a 90°-symmetry.

The calculate image gradient map module 2206 can calculate the image gradient map 772 by combining the first gradient map 774 and the second gradient map 776. The first gradient map 774 and the second gradient map 776 can be combined in a variety of methods. For example, the first gradient map 774 and the second gradient map 776 can be combined by adding the gradient at each corresponding point in the first gradient map 774 and the second gradient map 776. In another example, the first gradient map 774 and the second gradient map 776 can be combined by multiplying the two gradient maps together.

The generate depth map module 2208 can generate the depth map 770 of FIG. 7 by combining the image gradient map 772 and the depth of the vanishing point 132. The depth map 770 can represent the apparent depth of each pixel in the source image 130. The image gradient map 772 represents the relative depth of each pixel in the source image 130. The depth map 770 can be generated in a variety of methods. For example, the depth map 770 can be generated by scaling the relative depth of the image gradient map 772 with the depth of the vanishing point 132.

The first control unit 602 of FIG. 6 can execute the first software 618 of FIG. 6 for the calculate first gradient map module 2202 to calculate the first gradient map 774. The first control unit 602 can execute the first software 618 for the calculate second gradient map module 2204 to calculate the second gradient map 776. The first control unit 602 can execute the first software 618 for the calculate image gradient map module 2206 to calculate the image gradient map 772. The first control unit 602 can execute the first software 618 for the generate depth map module 2208 to generate the depth map 770.

Figure 23:
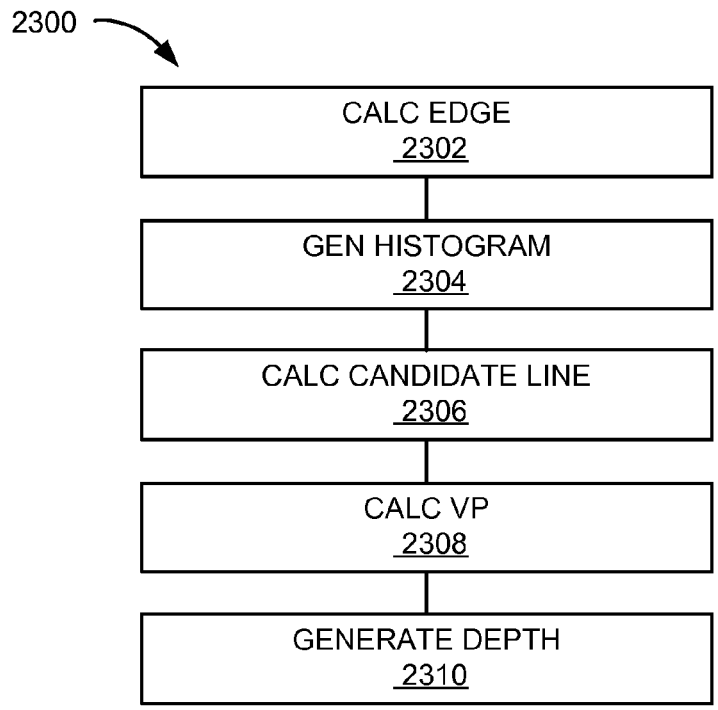
FIG. 23 is a flow chart of a method of operation of the three-dimensional display system in a further embodiment of the present invention.

Referring now to FIG. 23, therein is shown a flow chart of a method 2300 of operation of the three-dimensional display system 100 of FIG. 1 in a further embodiment of the present invention. The method 2300 includes: calculating an edge pixel image from a source image in a module 2302; generating a line histogram from the edge pixel image by applying a transform in a module 2304; calculating a candidate line from the line histogram meeting or exceeding a line category threshold for a horizontal line category, a vertical line category, a diagonal line category, or a combination thereof in a module 2306; calculating a vanishing point on the candidate line in a module 2308; and generating a depth map for the vanishing point for displaying the source image on a first device in a module 2310.

It has been discovered that the present invention thus has numerous aspects.

A principle aspect that has been unexpectedly discovered is that the present invention can provide a simplified mechanism for displaying three-dimensional images.

Another aspect is the present invention reduces computational requirements, yet provides good three-dimensional image quality. This allows real-time display of three-dimensional images.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the graphical display system of the present invention furnishes important and heretofore unknown and unavailable solutions, capabilities, and functional aspects for displaying three-dimensional images. The resulting method, process, apparatus, device, product, and/or system is straightforward, cost-effective, uncomplicated, highly versatile and effective, can be surprisingly and unobviously implemented by adapting known technologies, and are thus fully compatible with conventional manufacturing methods or processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a display system comprising:
    calculating an edge pixel image from a source image;
    generating a line histogram from the edge pixel image by applying a transform;
    calculating a candidate line from the line histogram meeting or exceeding a line category threshold for a horizontal line category, a vertical line category, a diagonal line category, or a combination thereof;
    calculating a vanishing point on the candidate line; and
    generating a depth map for the vanishing point for displaying the source image on a first device.

2. The method as claimed in claim 1 wherein generating the line histogram includes calculating a Gradient-based Hough transform on the edge pixel image.

3. The method as claimed in claim 1 further comprising:
    identifying a first vanishing line for the candidate line having a diagonal orientation;
    identifying a second vanishing line for the candidate line having the diagonal orientation and non-parallel with the first vanishing line; and
    wherein:
    calculating the vanishing point for the intersection of the first vanishing line and the second vanishing line.

4. The method as claimed in claim 1 further comprising:
    identifying a first vanishing line for the candidate line having a diagonal orientation;
    identifying a second vanishing line for the candidate line having a horizontal orientation; and
    wherein:
    calculating the vanishing point for the intersection of the first vanishing line and the second vanishing line.

5. The method as claimed in claim 1 further comprising:
    identifying a first vanishing line for the candidate line having a diagonal orientation;
    identifying a second vanishing line for the candidate line having a vertical orientation; and
    wherein:
    calculating the vanishing point for the intersection of the first vanishing line and the second vanishing line.

6. A method of operation of a display system comprising:
    calculating an edge pixel image from a source image;
    generating a line histogram from the edge pixel image by applying a transform;
    selecting a line category threshold for a horizontal line category, a vertical line category, a diagonal line category, or a combination thereof;

calculating a candidate line from the line histogram meeting or exceeding the line category threshold for the horizontal line category, the vertical line category, the diagonal line category, or a combination thereof;
calculating a vanishing point on the candidate line; and
generating a depth map for the vanishing point for displaying the source image on a first device.

7. The method as claimed in claim 6 wherein calculating the candidate line includes:
identifying a local maxima of the line histogram for a horizontal line category, the vertical line category, the diagonal line category, or the combination thereof; and
assigning the line category threshold to a pre-defend value for the horizontal line category, the vertical line category, the diagonal line category, or a combination thereof.

8. The method as claimed in claim 6 wherein generating the depth map includes:
detecting a horizontal line;
calculating a first gradient map for the region above the horizontal line having an upper depth distribution;
calculating a second gradient map for the region below the horizontal line having a lower depth distribution; and
generating the depth map by combining the first gradient map and the second gradient map.

9. The method as claimed in claim 6 wherein generating the depth map includes:
detecting a first diagonal line;
detecting a second diagonal line intersecting of the first diagonal line and the second diagonal line in an upper region of the source image;
calculating a first gradient map having an isotropic gradient distribution with circular symmetry based on the vanishing point;
calculating a second gradient map having a rhombus-shaped gradient distribution centered on the intersection vanishing point with ninety degree symmetry; and
generating the depth map by combining the first gradient map and the second gradient map.

10. The method as claimed in claim 6 wherein generating the depth map includes generating the depth map by combining a horizontal gradient map and a rhombus-shaped gradient map.

11. A three-dimensional display system comprising:
a first storage unit configured to store a source image;
an edge detection module, coupled to the first storage unit, configured to calculate an edge pixel image from the source image;
a straight line search module, coupled to the edge detection module, configured to generate a line histogram from the edge pixel image using a transform;
a line detection module, coupled to the straight line search module, configured to calculate a candidate line from the line histogram;
a vanishing point calculation module, coupled to the line detection module, configured to calculate a vanishing point on the candidate line; and
a depth generation module, coupled to the vanishing point calculation module, configured to generate a depth map from the vanishing point for displaying the source image on a first device.

12. The system as claimed in claim 11 wherein the straight line search module is configured to generate the line histogram by calculating a gradient-based Hough transform on the edge pixel image.

13. The system as claimed in claim 11 further comprising:
a vanishing line search module, coupled to the line detection module, configured to identify a first vanishing line having a diagonal orientation and a second vanishing line having a diagonal orientation and non-parallel with the first vanishing line; and
wherein:
the calculate vanishing point module is configured to calculate the vanishing point for the intersection of the first vanishing line and the second vanishing line.

14. The system as claimed in claim 11 further comprising:
a vanishing line search module, coupled to the line detection module, configured to identify a first vanishing line having a diagonal orientation and a second vanishing line having a horizontal orientation; and
wherein:
the calculate vanishing point module is configured to calculate the vanishing point for the intersection of the first vanishing line and the second vanishing line.

15. The system as claimed in claim 11 further comprising:
a vanishing line search module, coupled to the line detection module, configured to identify a first vanishing line having a diagonal orientation and a second vanishing line having a vertical orientation; and
wherein:
the calculate vanishing point module is configured to calculate the vanishing point for the intersection of the first vanishing line and the second vanishing line.

16. The system as claimed in claim 11 wherein:
the line detection module is configured to identify a local maxima of the line histogram for a horizontal line category, a vertical line category, a diagonal line category, or a combination thereof.

17. The system as claimed in claim 16 further comprising a vanishing line search module, coupled to the line detection module, configured to calculate a first vanishing line and a second vanishing line.

18. The system as claimed in claim 16 further comprising:
a calculate first gradient map module, coupled to the depth generation module, configured to calculate a first gradient map for the region above the horizontal line having an upper depth distribution;
a calculate second gradient map module, coupled to the depth generation module, configured to calculate a second gradient map for the region below the horizontal line having a lower depth distribution; and
wherein:
the depth generation module is configured to generate the depth map from the first gradient map and the second gradient map.

19. The system as claimed in claim 16 further comprising:
a calculate first gradient map module, coupled to the depth generation module, configured to calculate a first gradient map having an isotropic gradient distribution with circular symmetry around the vanishing point;
a calculate second gradient map module, coupled to the depth generation module, configured to calculate a second gradient map having a rhombus-shaped gradient distribution around the vanishing point; and
wherein:
the depth generation module is configured to generate the depth map from the first gradient map and the second gradient map.

20. The system as claimed in claim 16 further comprising:
a calculate first gradient map module, coupled to the depth generation module, configured to calculate a horizontal gradient map;

a calculate second gradient map module, coupled to the depth generation module, configured to calculate a second gradient map having a rhombus-shaped gradient distribution around the vanishing point; and wherein:

the depth generation module is configured to generate the depth map from the first gradient map and the second gradient map.

* * * * *